US00RE45310E

(19) United States
(12) Reissued Patent
Morita et al.

(10) Patent Number: US RE45,310 E
(45) Date of Reissued Patent: Dec. 30, 2014

(54) CATHODE ACTIVE MATERIAL, CATHODE THEREWITH AND NONAQUEOUS ELECTROLYTE SECONDARY BATTERY

(71) Applicant: Sony Corporation, Tokyo (JP)

(72) Inventors: Koji Morita, Fukushima (JP); Hiroyuki Yamaguchi, Fukushima (JP); Masayuki Ihara, Fukushima (JP); Shunsuke Saito, Fukushima (JP)

(73) Assignee: Sony Corporation, Tokyo (JP)

(21) Appl. No.: 13/895,068

(22) Filed: May 15, 2013

Related U.S. Patent Documents

Reissue of:
(64) Patent No.: 8,377,589
Issued: Feb. 19, 2013
Appl. No.: 13/472,237
Filed: May 15, 2012

U.S. Applications:
(63) Continuation of application No. 12/366,367, filed on Feb. 5, 2009, now Pat. No. 8,349,489.

(30) Foreign Application Priority Data

Feb. 13, 2008 (JP) ..... 2008-031930

(51) Int. Cl.
*H01M 4/13* (2010.01)

(52) U.S. Cl.
USPC ..... 429/212

(58) Field of Classification Search
None
See application file for complete search history.

(56) References Cited

U.S. PATENT DOCUMENTS 6,372,385 B1 4/2002 Kweon et al.
6,653,021 B2 11/2003 Kweon et al.
2002/0076613 A1 6/2002 Lee et al.
2004/0137333 A1 7/2004 Nishiyama et al.
2009/0136855 A1* 5/2009 Yamaguchi et al. ..... 429/343

FOREIGN PATENT DOCUMENTS

JP 05-036411 2/1993
JP 07-235292 9/1995
JP 10-154532 6/1998
JP 10-241681 9/1998

(Continued)

*Primary Examiner* — Patrick Ryan
*Assistant Examiner* — Wyatt McConnell
(74) *Attorney, Agent, or Firm* — K&L Gates LLP

(57) ABSTRACT

The invention provides a cathode active material that includes: a particle containing a cathode material capable of absorbing and releasing an electrode reactive material; and a film that is disposed at least partially to the particle and contains a metal salt represented by a formula (1).

[Chemical Formula 1]

(1)

(R1 represents a (a1+b1+c1) valent group and M1 represents a metallic element. a1, d1, e1 and n each represent an integer of 1 or more and b1 and c1 each represent an integer of 0 or more. However, b1 and c1 satisfy (b1+c1)≥1.), a cathode therewith and a non-aqueous electrolyte secondary battery.

30 Claims, 5 Drawing Sheets

(56) References Cited

FOREIGN PATENT DOCUMENTS

| | | | |
|---|---|---|---|
| JP | 11-162511 | | 6/1999 |
| JP | 11-204145 | | 7/1999 |
| JP | 3054829 | | 4/2000 |
| JP | 2000-149950 | | 5/2000 |
| JP | 2000-156227 | | 6/2000 |
| JP | 2000-164214 | | 6/2000 |
| JP | 2000-195517 | | 7/2000 |
| JP | 3172388 | | 3/2001 |
| JP | 3192855 | | 5/2001 |
| JP | 2001-256979 | | 9/2001 |
| JP | 2002-164053 | | 6/2002 |
| JP | 2002-231227 | | 8/2002 |
| JP | 2004-235145 | | 8/2004 |
| JP | 2004-281218 | * | 8/2004 |
| JP | 2004-281218 | | 10/2004 |
| JP | 2005-149750 | | 6/2005 |
| JP | 3691279 | | 6/2005 |
| JP | 2007-141733 | | 6/2007 |

* cited by examiner

CATHODE ACTIVE MATERIAL, CATHODE THEREWITH AND NONAQUEOUS ELECTROLYTE SECONDARY BATTERY

Matter enclosed in heavy brackets [ ] appears in the original patent but forms no part of this reissue specification; matter printed in italics indicates the additions made by reissue.

CROSS REFERENCES TO RELATED APPLICATIONS

The present application is a continuation of U.S. application Ser. No. 12/366,367 filed on Feb. 5, 2009, which claims priority to Japanese Patent Application JP 2008-031930 filed in the Japanese Patent Office on Feb. 13, 2008, the entire contents of which being incorporated herein by reference.

BACKGROUND

In recent years, an advancement in technologies of portable electronic devices is remarkable and electronic devices such as portable telephones and note book computers begin to be acknowledged as fundamental technologies supporting an advanced information society. Research and development of high-functional electronic devices are forwarded energetically and the consumption power of the electronic devices is proportionally increasing. On the other hand, the electronic devices are demanded to operate for a longer time. Accordingly, higher energy density of secondary batteries that are a driving power source is necessarily desired. Furthermore, extension of the cycle life as well is desired from the viewpoint of environmental consideration.

The energy density of a battery is desirable to be higher from the viewpoint of an occupied volume and a weight of a battery incorporated in an electronic device. At the present time, almost all devices incorporate a lithium ion secondary battery because the lithium ion secondary battery has better energy density at high voltages than other battery systems.

Usually, a lithium ion secondary battery uses a lithium transition metal composite oxide such as lithium cobalt oxide ($LiCoO_2$) or lithium nickel oxide ($LiNiO_2$) in a cathode and a carbon material in an anode and is used at an operation voltage in the range of 4.2 to 2.5 V. A reason why a terminal voltage is raised up to 4.2 V in a unit cell largely depends on excellent electrochemical stability of a non-aqueous electrolyte material and a separator.

In order to make the lithium ion secondary batteries higher in the performance and to expand applications thereof, much research is being performed. As one of the researches, a method of raising a charge voltage is under study. According to the method, the energy density of a cathode active material including lithium cobalt oxide is raised and thereby a lithium ion secondary battery is made larger in capacity.

However, when charge and discharge are repeated at high capacity, there is a problem in that the capacity is deteriorated and thereby a battery lifetime is shortened. Furthermore, when a battery is used under high temperature environment, gas is generated inside of the battery and thereby problems such as leakage and battery deformation are caused.

In this connection, for instance, Japanese Patent No. 3172388 shown below discloses a method where a surface of a cathode is covered with a metal oxide so as to improve the battery characteristics such as the charge-discharge cycle characteristics. Furthermore, Japanese Patent No. 3691279 shown below discloses a method where a surface of a cathode active material is covered with a metal oxide so as to heighten structural stability and thermal stability.

In the surface coating of a cathode active material, effects of improvements in the cycle characteristics or thermal stability owing to the coating forms are being studied as well. For instance, in Japanese Patent Application Laid-Open (JP-A) Nos. 7-235292, 2000-149950, 2000-156227, 2000-164214, 2000-195517 and 2002-231227 shown below, methods of uniformly coating a lithium transition metal composite oxide are disclosed. Furthermore, in JP-A No. 2001-256979 shown below, a cathode active material where a block of metal oxide is attached onto a metal oxide layer is disclosed.

Elements used in the surface coating as well are studied. For instance, JP-A No. 2002-164053 shown below discloses a cathode active material in which at least one surface-treated layer containing at least two coating elements is coated on a surface of a lithium compound that is a core.

Japanese Patent No. 3054829 shown below discloses a battery having excellent charge-discharge characteristics, which uses a material of which a particle surface is covered with phosphorus (P). JP-A No. 05-36411 shown below discloses a battery having excellent charge-discharge cycle characteristics and large current charge-discharge characteristics, which uses a cathode to which phosphorus (P) is added. Furthermore, Japanese Patent No. 3192855 shown below discloses a method of forming a layer containing boron (B), phosphorus (P) or nitrogen (N). Still furthermore, JP-A Nos. 10-154532, 10-241681 and 11-204145 shown below disclose a method of letting a phosphate compound contain in a cathode.

However, the coating element, coating method and coating form, which are disclosed in Japanese Patent Nos. 3172388 and 3691279 disturb diffusion of lithium ions. Accordingly, there is a disadvantage in that a sufficient capacity is not obtained in a charge-discharge current value in a practical region.

According to the methods disclosed in JP-A Nos. 7-235292, 2000-149950, 2000-156227, 2000-164214, 2000-195517 and 2002-231227, although a high capacity is maintained, it is insufficient to largely improve the cycle characteristics and to suppress the gas from generating. Furthermore, when a cathode active material having a structure where a block of a metal oxide is attached onto a metal oxide layer is prepared according to the method disclosed in JP-A No. 2001-256979, sufficient charge-discharge efficiency is not obtained and a capacity results in largely deteriorating.

The advantage of JP-A No. 2002-164053 is limited only to an improvement in the thermal stability. Furthermore, when a cathode active material is prepared according to a producing method disclosed in JP-A No. 2002-164053, a uniform multilayered layer is formed, and, in particular, a gas is not suppressed from generating but the gas generation is increased on the contrary.

Japanese Patent No. 3054829, JP-A No. 05-36411 and Japanese Patent No. 3192855 intend to improve the cycle characteristics by adding or coating phosphorus to or on the cathode active material. However, the technologies where only an inactive light element is applied to lithium are incapable of obtaining a sufficient reversible capacity.

JP-A No. 10-154532 discloses a technology relating to safeness at the time of overcharging. Furthermore, only by simply mixing a phosphate compound in a cathode, in actuality, a sufficient advantage is not obtained. Similarly, in JP-A Nos. 10-241681 and 11-204145 as well, a phosphate compound is simply mixed in a cathode. Accordingly, a sufficient advantage is not obtained.

As mentioned above, when a cathode active material is modified, the cycle characteristics or thermal stability are improved to some extent, however, a battery capacity tends to be lowered on the other hand. Furthermore, an extent of an improvement in the battery characteristics, which is obtained by the methods described above, is not sufficient and the suppression of gas generated inside of a battery under a high temperature environment is demanded to be further improved.

SUMMARY

Accordingly, the present disclosure provides a cathode active material that has a high capacity and is excellent in the charge-discharge cycle characteristics and capable of suppressing a gas from generating, a cathode therewith and a non-aqueous electrolyte secondary battery.

In order to overcome the above-mentioned problems, according to a first aspect, there is provided a cathode active material that includes:

a particle containing a cathode material capable of absorbing and releasing an electrode reactive material; and a film that is disposed at least partially to the particle and contains a metal salt represented by a formula (1).

[Chemical Formula 6]

(1)

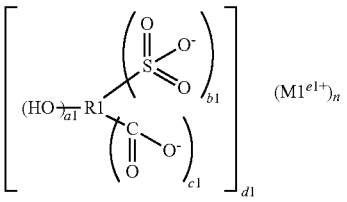

(R1 represents a (a1+b1+c1) valent group and M1 represents a metallic element. a1, d1, e1 and n each represent an integer of 1 or more and b1 and c1 each represent an integer of 0 or more. However, b1 and c1 satisfy (b1+c1)≥1.

According to a second aspect, there is provided a cathode that includes:

a conductive base material; and a cathode active material layer that is disposed on the conductive base material and at least contains a cathode active material, wherein the cathode active material includes:

a particle containing a cathode material capable of absorbing and releasing an electrode reactive material; and a film that is disposed at least partially to a particle and contains a metal salt represented by a formula (1).

[Chemical Formula 7]

(1)

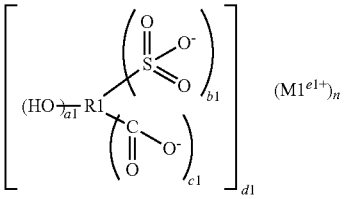

(R1 represents a (a1+b1+c1) valent group and M1 represents a metallic element. a1, d1, e1 and n each represent an integer of 1 or more and b1 and c1 each represent an integer of 0 or more. However, b1 and c1 satisfy (b1+c1)≥1.

According to a third aspect, there is provided a non-aqueous electrolyte secondary battery that includes a cathode having a cathode material, an anode, a separator and an electrolyte, wherein the cathode active material includes:

a particle containing a cathode material capable of absorbing and releasing an electrode reactive material; and a film that is disposed at least partially to a particle and contains a metal salt represented by a formula (1).

[Chemical Formula 8]

(1)

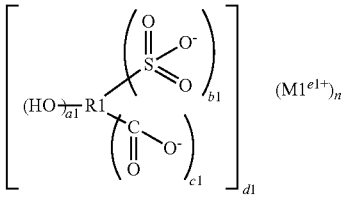

(R1 represents a (a1+b1+c1) valent group and M1 represents a metallic element. A1, d1, e1 and n each represent an integer of 1 or more and b1 and c1 each represent an integer of 0 or more. However, b1 and c1 satisfy (b1+c1)≥1.

In an embodiment, a film containing a metal salt represented by the formula (1) is formed at least partially to a particle containing a cathode material capable of absorbing and releasing an electrode reactive material. Accordingly, the chemical stability of a cathode active material may be improved. In the case where a cathode having the cathode active material is used together with an electrolytic solution in an electrochemical device such as a battery, the electrode reactive material permeates efficiently and the electrolytic solution is inhibited from decomposing. Accordingly, a battery that uses the cathode active material may realize high charge voltage property and high energy density accompanying the high charge voltage property, may have excellent charge-discharge cycle characteristics even under a high charge voltage and may suppress a gas from generating inside of a battery.

Accordingly, a non-aqueous electrolyte secondary battery that is high in capacity, excellent in the charge-discharge cycle characteristics and less in gas generation inside of a battery may be realized.

Other features and advantages will be apparent from the following description taken in conjunction with the accompanying drawings, in which like reference characters designate the same or similar parts throughout the figures thereof.

Additional features and advantages are described herein, and will be apparent from the following Detailed Description and the figures.

DETAILED DESCRIPTION

Figure 1:
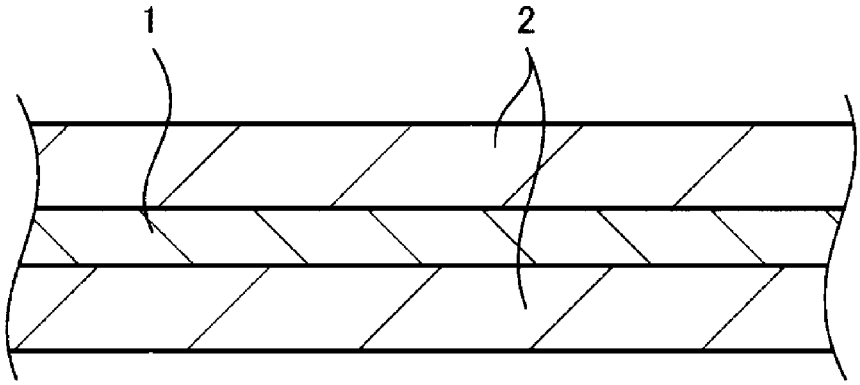
FIG. 1 is an enlarged sectional view showing a configuration of a cathode according to an exemplary embodiment.

In what follows, one exemplary embodiment will be described with reference to the drawings.

(1) Configuration of Cathode Active Material

In a cathode active material according to one exemplary embodiment, a particle containing a cathode material capable of absorbing and releasing an electrode reactive material is at least partially provided with a film.

As a cathode material capable of absorbing and releasing an electrode reactive material, a compound capable of absorbing and releasing lithium is preferred. Preferable specific examples of cathode material include lithium-containing compounds such as lithium oxide, lithium phosphate, lithium sulfide or lithium-containing intercalation compounds and combinations of at least two kinds thereof. In order to heighten the energy density, lithium-containing transition metal oxides containing lithium (Li) and at least one of transition metal elements are preferred. Among these, lithium-containing compounds having an layered structure such as lithium cobalt oxide, lithium nickel oxide or lithium, nickel, cobalt and manganese composite oxide are preferred from the viewpoint of realizing higher capacity. In particular, a lithium cobalt oxide-containing transition metal oxide mainly made of lithium cobalt oxide is preferred from the viewpoint of higher packing property and high discharge voltage. The lithium cobalt oxide-containing transition metal oxide may be one obtained by substituting with at least one element selected from 2 to 15 groups or by applying a fluorination treatment.

Examples of such lithium-containing compounds include a lithium composite oxide having an average composition represented by, for instance, Chemical Formula I, more specifically, by Chemical Formula II, and a lithium composite oxide having an average composition represented by Chemical Formula III.

$$Li_pNi_{(1-q-r)}Mn_qM1_rO_{(2-y)}X_z \quad \text{(Chemical Formula I)}$$

(In the formula, M1 represents at least one kind of elements selected from 2 through 15 groups excluding nickel (Ni) and manganese (Mn). X represents at least one kind of 16 group elements and 17 group elements excluding oxygen (O). p, q, r, y and z are values in the ranges of $0 \le p \le 1.5$, $0 \le q \le 1.0$, $0 \le r \le 1.0$, $-0.10 \le y \le 0.20$ and $0 \le z \le 0.2$. A composition of lithium is different depending on a state of charge and discharge and a value of p represents a value in a completely discharged state.)

$$Li_aCo_{(1-b)}M2_bO_{(2-c)} \quad \text{(Chemical Formula II)}$$

(In the formula, M2 represents at least one kind among a group consisting of vanadium (V), copper (Cu), zirconium (Zr), zinc (Zn), magnesium (Mg), aluminum (Al), gallium (Ga), yttrium (Y) and iron (Fe). a, b and c are values in the ranges of $0.9 \le a \le 1.1$, $0 \le b \le 0.3$ and $-0.1 \le c \le 0.1$, respectively. A composition of lithium is different depending on a state of charge and discharge and a value of a represents a value in a completely discharged state.)

$$Li_wNi_xCo_yMn_zM3_{(1-x-y-z)}O_{(2-v)} \quad \text{(Chemical Formula III)}$$

(In the formula, M3 represents at least one kind of a group consisting of vanadium (V), copper (Cu), zirconium (Zr), zinc (Zn), magnesium (Mg), aluminum (Al), gallium (Ga), yttrium (Y) and iron (Fe). v, w, x and y are values in the ranges of $-0.1 \le v \le 0.1$, $0.9 \le w \le 1.1$, $0 < x < 1$, $0 < y < 1$, $0 < z < 0.5$ and $0 \le 1-x-y-z$. A composition of lithium is different depending on a state of charge and discharge and a value of w represents a value in a completely discharged state.)

Furthermore, as a lithium-containing compound, a lithium composite oxide having a spinel structure represented by, for instance, Chemical Formula IV, more specifically, by $Li_dMn_2O_4$ ($d \approx 1$) is cited.

$$Li_pMn_{(2-q)}M4_qO_rF_s \quad \text{(Chemical Formula IV)}$$

(In the formula, M4 represents at least one kind of a group consisting of cobalt (Co), Nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W). p, q, r and s are values in the ranges of $0.9 \le p \le 1.1$, $0 \le q \le 0.6$, $3.7 \le r \le 4.1$ and $0 \le s \le 0.1$. A composition of lithium is different depending on a state of charge and discharge and a value of p represents a value in a completely discharged state.)

Furthermore, as a lithium-containing compound, a lithium composite phosphate having an olivine structure represented by, for instance, Chemical Formula V, more specifically, by Chemical Formula VI, and still more specifically by $Li_eFePO_4$ ($e \approx 1$) is cited.

$$Li_aM5_bPO_4 \quad \text{(Chemical Formula V)}$$

(In the formula, M5 represents at lest one kind of elements selected from 2 through 5 groups. a and b are values in the ranges of $0 \le a \le 2.0$ and $0.5 \le b \le 2.0$.

$$Li_tM6PO_4 \quad \text{(Chemical Formula VI)}$$

(In the formula, M6 represents at least one kind of a group consisting of cobalt (Co), Manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr). t is a value in the range of $0.9 \le t \le 1.1$. A composition of lithium is different depending on a state of charge and discharge and a value of t represents a value in a completely discharged state.)

As such particles, those that are available usually as a cathode active material may be used as a starting material. However, those that are available usually as a cathode active material may be used after secondary particles thereof are crushed by use of a ball mill or a grinding mixer, as required.

Furthermore, a lithium composite oxide particle on a surface of which an element different from a main transition metal is present may be used by coating with an element different from the main transition metal constituting a lithium composite oxide. This is because, thereby, higher electrochemical stability is obtained. As an element different from the main transition metal, at least one of nickel (Ni), manganese (Mn) and phosphorus (P) is preferably contained. The main transition metal constituting the lithium composite oxide particle means a transition metal largest in a ratio among transition metals constituting the particle. For instance, when lithium cobalt oxide having an average composition of $LiCo_{0.98}Al_{0.01}Mg_{0.01}O_2$ is used as lithium composite oxide, the main transition metal is cobalt and the coating is applied preferably with nickel, manganese or phosphorus.

As the cathode material capable of absorbing and releasing an electrode reactive material, other than those mentioned above, oxides such as titanium oxide, vanadium oxide or manganese dioxide; disulfides such as iron disulfide, titanium disulfide or molybdenum sulfide; chalcogenides such as niobium selenide; and conductive polymers such as sulfur, polyaniline or polythiophene are cited.

A film disposed at least partially to the particle may be formed so as to cover an entirety of a surface of the particle containing a cathode material capable of absorbing and releasing an electrode reactive material or may be formed on a part or more of a surface. The film contains a metal salt represented by a formula (1).

[Chemical Formula 9]

(1)

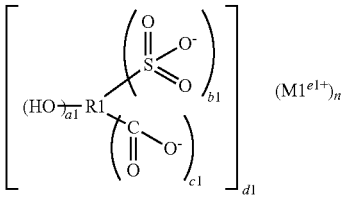

(R1 represents a (a1+b1+c1) valent group and M1 represents a metallic element. a1, d1, e1 and n each represent an integer of 1 or more and b1 and c1 each represent an integer of 0 or more. However, b1 and c1 satisfy (b1+c1)≥1.

The film like this contributes to an improvement in the chemical stability of the cathode active material. When a cathode that uses a cathode active material provided with the film like this is used together with an electrolytic solution in an electrochemical device such as a battery, the electrode reactive material permeates efficiently and the electrolytic solution is inhibited from decomposing. Accordingly, the suppression of gas generation from a cathode and high capacity of the battery may be combined. Furthermore, the cycle characteristics as well may be improved by inhibiting the electrolytic solution from decomposing. In the film, a metal salt represented by a formula (1) and the decomposition product thereof may be contained.

The metal salt represented by the formula (1) has a hydroxyl group (—OH) and at least one of a sulfonate group (—$SO_3$) and a carboxyl group (—COO). Numbers of the hydroxyl group, sulfonate group and carboxyl group may be arbitrarily set.

The R1 in the formula (1) may be any group as long as it is a (a1+b1+c1) valent group. However, among those, a group having carbon as a constituent element is preferred. Examples of such R1 include a chain saturated hydrocarbon group, a chain unsaturated hydrocarbon group, a ring saturated hydrocarbon group, a ring unsaturated hydrocarbon group and a halogenated group thereof. In this case, the hydroxyl group or the like is preferably bonded to a carbon atom in the R1. The "chain hydrocarbon group" may be a straight chain hydrocarbon group or a branched chain hydrocarbon group. Furthermore, the "halogenated group" means a group where at least a part of hydrogens of a hydrocarbon group is substituted by a halogen. The kind of halogen is not particularly restricted, however, among these, fluorine or chlorine is preferred, and fluorine is more preferred.

As the M1 shown in the formula (1), an alkali metal element (1A-group element excluding hydrogen) or an alkaline earth metal element (2A-group element) is preferably used. In particular, lithium is preferred among the alkali metal elements and magnesium or calcium is preferred among the alkali earth metal elements. This is because when the lithium, magnesium or calcium is used, a high advantage is obtained. The M1 may be at least two kinds of metallic elements.

Specific examples of metal salts represented y the formula (1) include those shown below.

The metal salt represented by the formula (1) is a metal salt represented by, for instance, a formula (2). The metal salt has a hydroxyl group and a sulfone group.

[Chemical Formula 10]

(2)

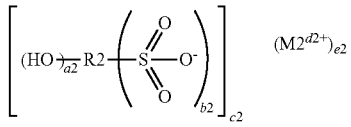

(R2 is a (a2+b2) valent group and M2 is a metallic element. a2, b2, c2, d2 and e2 each are an integer of 1 or more.)

Alternatively the metal salt represented by the formula (1) is a metal salt represented by, for instance, a formula (3). The metal salt has a hydroxyl group and a sulfonate group.

[Chemical Formula 11]

(3)

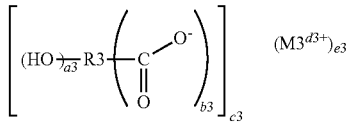

(R3 is a (a3+b3) valent group and M3 is a metallic element. a3, b3, c3, d3 and e3 each are an integer of 1 or more.)

Alternatively, the metal salt represented by the formula (1) is a metal salt represented by, for instance, a formula (4). The metal salt has a hydroxyl group and a sulfonate group.

[Chemical Formula 12]

(4)

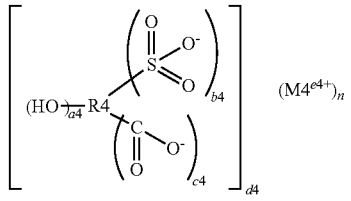

(R4 is a (a4+b4+c4) valent group and M4 is a metallic element. a4, b4, c4, d4, e4 and f4 each are an integer of 1 or more.)

Examples of the metal salt represented by the formula (2) include metal salts represented by, for instance, formulas (5) through (38). Examples of the metal salt represented by the formula (3) include metal salts represented by, for instance, formulas (39) through (66). These may be used singularly or in a mixture of a plurality of kinds thereof. Among those, lithium 2-hydroxypropane sulfonate represented by a formula (8), or, lithium 2-hydroxypropene sulfonate represented by a formula (13), lithium 4-hydroxy butyrate represented by a formula (43) and lithium 4-hydroxy-2-butenate represented by a formula (46) are preferred from the viewpoint of obtaining more advantages.

[Chemical Formula 13]
(5)
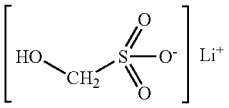
[Chemical Formula 14]
(6)
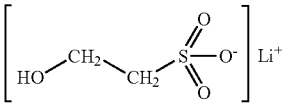
[Chemical Formula 15]
(7)
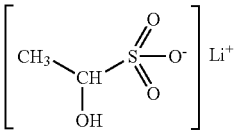
[Chemical Formula 16]
(8)
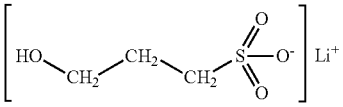
[Chemical Formula 17]
(9)
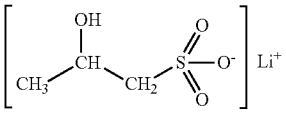
[Chemical Formula 18]
(10)
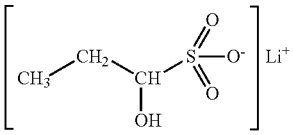
[Chemical Formula 19]
(11)
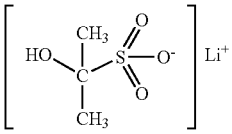
[Chemical Formula 20]
(12)
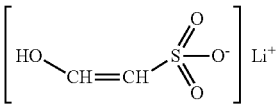
[Chemical Formula 21]
(13)
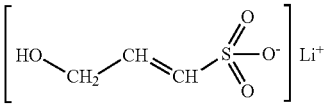
-continued
[Chemical Formula 22]
(14)
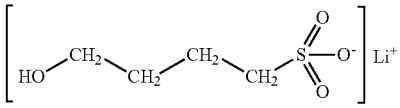
[Chemical Formula 23]
(15)
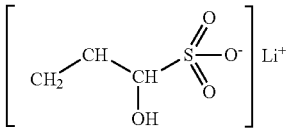
[Chemical Formula 24]
(16)
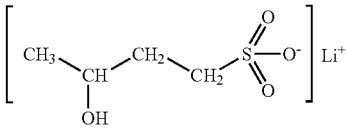
[Chemical Formula 25]
(17)
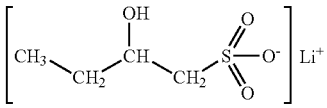
[Chemical Formula 26]
(18)
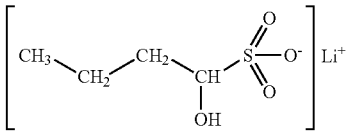
[Chemical Formula 27]
(19)
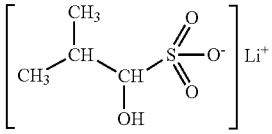
[Chemical Formula 28]
(20)
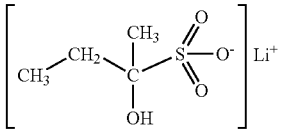
[Chemical Formula 29]
(21)
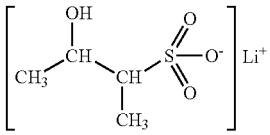
[Chemical Formula 30]
(22)
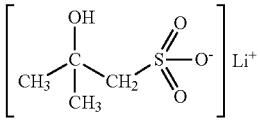

-continued
[Chemical Formula 31]
(23)
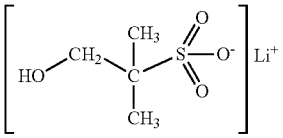
[Chemical Formula 32]
(24)
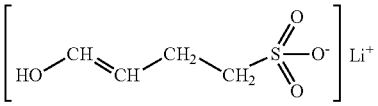
[Chemical Formula 33]
(25)
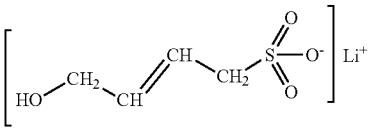
[Chemical Formula 34]
(26)
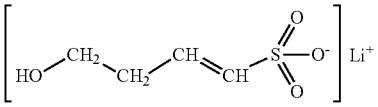
[Chemical Formula 35]
(27)
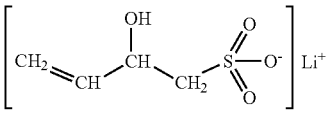
[Chemical Formula 36]
(28)
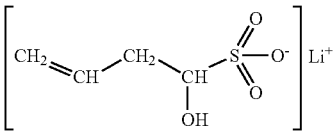
[Chemical Formula 37]
(29)
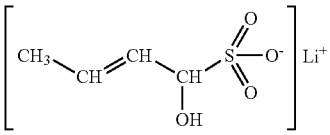
[Chemical Formula 38]
(30)
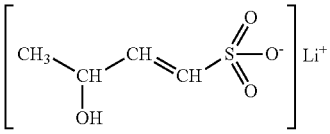
[Chemical Formula 39]
(31)
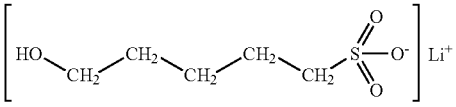
-continued
[Chemical Formula 40]
(32)
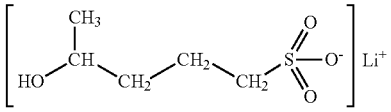
[Chemical Formula 41]
(33)
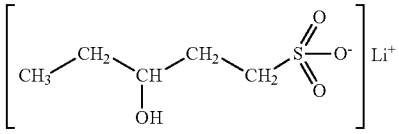
[Chemical Formula 42]
(34)
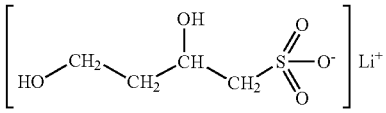
[Chemical Formula 43]
(35)
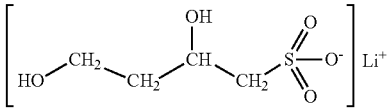
[Chemical Formula 44]
(36)
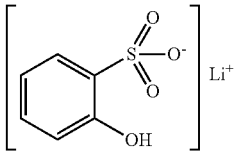
[Chemical Formula 45]
(37)
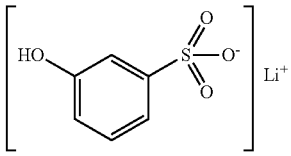
[Chemical Formula 46]
(38)
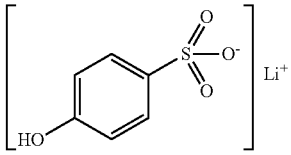
[Chemical Formula 47]
(39)
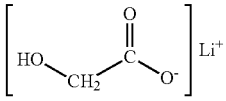
[Chemical Formula 48]
(40)
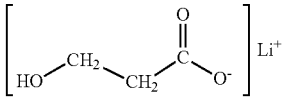

-continued
[Chemical Formula 49]
(41)
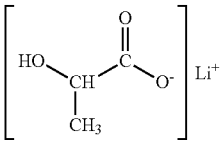
[Chemical Formula 50]
(42)
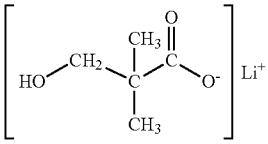
[Chemical Formula 51]
(43)
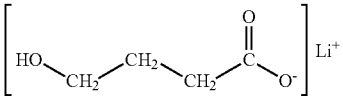
[Chemical Formula 52]
(44)
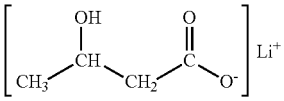
[Chemical Formula 53]
(45)
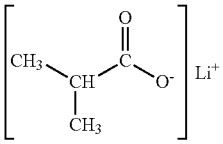
[Chemical Formula 54]
(46)
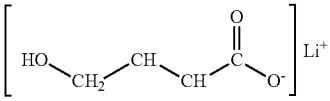
[Chemical Formula 55]
(47)
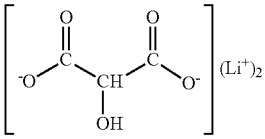
[Chemical Formula 56]
(48)
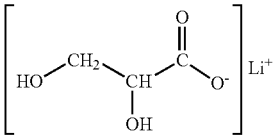
[Chemical Formula 57]
(49)
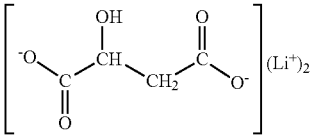
-continued
[Chemical Formula 58]
(50)
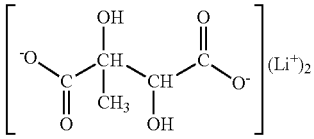
[Chemical Formula 59]
(51)
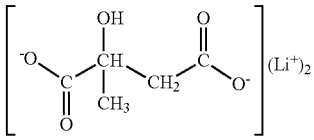
[Chemical Formula 60]
(52)
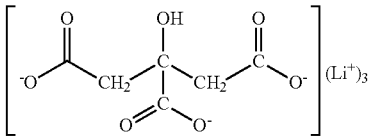
[Chemical Formula 61]
(53)
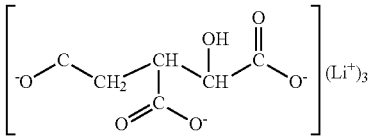
[Chemical Formula 62]
(54)
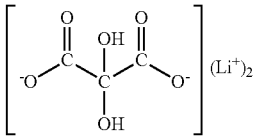
[Chemical Formula 63]
(55)
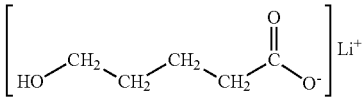
[Chemical Formula 64]
(56)
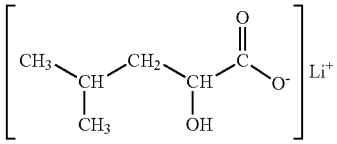
[Chemical Formula 65]
(57)
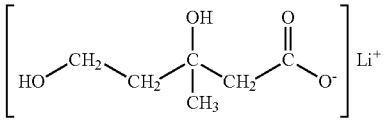

-continued

[Chemical Formula 66]

(58)

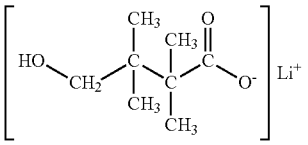

[Chemical Formula 67]

(59)

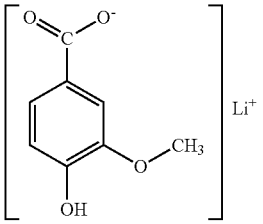

[Chemical Formula 68]

(60)

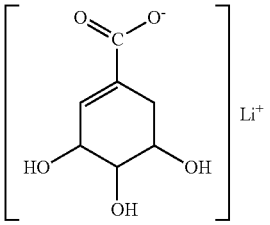

[Chemical Formula 69]

(61)

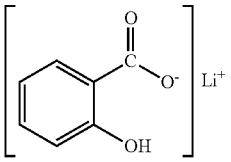

[Chemical Formula 70]

(62)

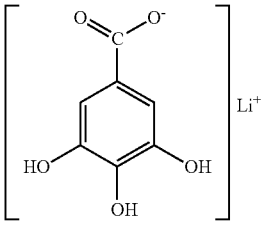

[Chemical Formula 71]

(63)

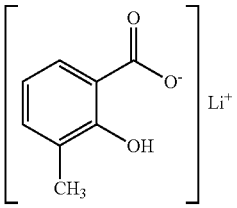

-continued

[Chemical Formula 72]

(64)

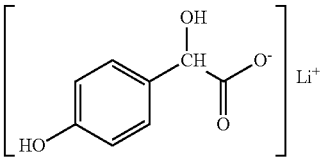

[Chemical Formula 73]

(65)

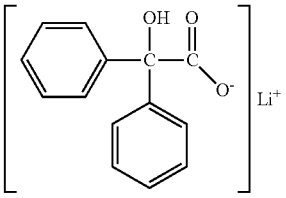

[Chemical Formula 74]

(66)

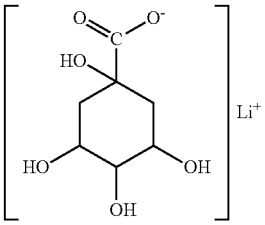

In a film, above-mentioned metal salts may be arbitrarily mixed and used as the metal salt represented by the formula (1).

Furthermore, the film may preferably contain, in addition to the compound, an alkali metal salt or an alkaline earth metal salt other than the metal salts represented by the formula (1). Among those, another lithium salt is preferably contained. This is because the film resistance is lowered and the cycle characteristics are more improved. Examples of the other alkali metal salts or other alkaline earth metal salts include carbonate, halogenide salt, borate or phosphate of alkali metal element or alkaline earth metal element or salts having two or more of sulfonic acid and carboxylic acid in total.

More specific examples include lithium carbonate ($Li_2CO_3$), lithium fluoride (LiF), lithium tetraborate ($Li_2B_4O_7$), lithium metaborate ($LiBO_2$), lithium pyrophosphate ($Li_4P_2O_7$) or lithium tripolyphosphate ($Li_5P_3O_{10}$), lithium orthosilicate ($Li_4SiO_4$) or lithium metasilicate ($Li_2SiO_3$), dilithium ethanedisulfonate, dilithium propane disulfonate, dilithium sulfoacetate, dilithium sulfopropionate, dilithium sulfobutanate, dilithium sulfobenzoate, dilithium succinate, trilithium sulfosuccinate, dilithium squarate, magnesium ethanedisulfonate, magnesium propanedisulfonate, magnesium sulfoacetate, magnesium sulfopropionate, magnesium sulfobutanate, magnesium sulfobenzoate, magnesium succinate, trimagnesium disulfosuccinate, calcium ethanedisulfonate, calcium propanedisulfonate, calcium sulfoacetate, calcium sulfopropionate, calcium sulfobutanate, calcium sulfobenzoate, calcium succinate and tricalcium disulfosuccinate. These may be used in a combination thereof.

The film containing the metal salt like this may be confirmed by analyzing a surface of a cathode active material by means of, for instance, TOF-SIMS (Time of Flight secondary Ion Mass Spectrometry).

An average particle diameter of the cathode active material is preferably in the range of 2.0 μm or more and 50 μm or less. This is because when the average particle diameter is less than 2.0 μm, in a press step when a cathode is prepared, the cathode active material tends to be peeled off from a cathode current collector and, since a surface area of the cathode active material becomes larger, an addition amount of a conductive agent or a binding agent has to be increased to result in smaller energy density per unit mass. On the other hand, when the average particle diameter exceeds 50 μm, the cathode active material penetrates through a separator. Accordingly, likelihood of causing short-circuiting becomes higher.

(2) Configuration of Cathode

An example of the cathode active material will be described with reference to FIG. 1. FIG. 1 shows a sectional structure of a cathode according to one exemplary embodiment. The cathode is used in an electrochemical device such as a battery and includes a cathode current collector 1 having a pair of facing faces and a cathode active material layer 2 disposed to the cathode current collector 1.

The cathode current collector 1 is preferably constituted of materials having excellent chemical stability, electric conductivity and mechanical strength. As the material like this, metallic material such as aluminum, nickel or stainless steel may be cited.

The cathode active material layer 2 contains one kind or two kinds or more of, for instance, the cathode active materials as mentioned above and is constituted by containing a conductive agent and a binder as required. The cathode active material layer 2 may be disposed either on both sides of the cathode current collector 1 or on one side.

As the conductive agents, carbon materials such as graphite, carbon black, acetylene black or Ketchen black are cited. These may be used singularly or in a combination of a plurality of kinds thereof. The conductive agent, as long as it is a material having the conductivity, may be either a metallic material or a conductive high molecule.

Examples of the binding agent include synthetic rubbers such as styrene-butadiene rubber, fluororubber or ethylene-propylene-diene rubber; and high molecule materials such as polyvinylidene fluoride. These may be used singularly or in a combination of a plurality of kinds thereof.

The cathode has a cathode active material on a surface of which a film containing a metal salt represented by the formula (1) is formed. Accordingly, when the cathode is used in an electrochemical device such as a battery, a capacity is made larger, the charge-discharge characteristics are improved and a gas is inhibited from generating.

(3) Producing method of Cathode Active Material and Cathode

A cathode active material and a cathode according to one embodiment are produced according to, for instance, procedures shown below. In the beginning, particles containing a cathode material that is usually available as a cathode active material and capable of absorbing and releasing an electrode reactive material are prepared as a starting material and particle surfaces are coated as required.

The coating is applied in such a manner that for instance lithium-containing composite oxide particles as the cathode material and a compound containing an element different from a main transition metal that constitutes the lithium-containing composite oxide are pulverized and mixed and the element different from the main transition metal that constitutes the lithium-containing composite oxide is coated on a surface of particles of the lithium-containing composite oxide. The coating may be applied by use of, for instance, a ball mill, a jet mill, a grinder or a micropulverizer. In this case, a small amount of liquid typical in water is effectively added. Furthermore, a mechanochemical process such as mechanofusion or a vapor phase method such as a sputtering method or a chemical vapor deposition method (CVD) may be used to coat. Still furthermore, a wet process such as a method where raw materials are mixed in water or a solvent such as ethanol, a neutralization titration method or a sol-gel method that uses metal alkoxide as a raw material may be used to coat.

The lithium-containing composite oxide particles coated with an element different from a main transition metal may be calcined at a temperature of for instance 300° C. or more and 1000° C. or less in an oxidizing atmosphere such as air or pure oxygen. Furthermore, after the calcination, as required, a particle size may be controlled by lightly pulverizing or classifying. The coating may be repeated twice or more to form different coated layers.

In the next place, a metal salt layer containing a metal salt represented by the formula (1) is formed at least partially on a surface of a particle of a starting material or a particle obtained by disposing a coated layer to the starting material as mentioned above, and thereby a cathode active material according to an exemplary embodiment is produced. In the specification, a layer of a surface of a cathode active material before a battery is assembled is called a coated layer and a layer on a surface of the cathode active material after the battery is assembled is appropriately called as a film. Examples of method of forming a metal salt layer to the particle include liquid phase methods such as a coating method, an immersion method or a dip coating method; and gas phase methods such as a vapor depositing method, a sputtering method or a CVD method. When a metal salt layer is formed, the methods may be used singularly or in a combination of at least two kinds thereof. Among these, as the liquid phase method, a solution containing a metal salt represented by the formula (1) is preferably used to form a metal salt layer. Specifically, for instance, particles containing a cathode material capable of absorbing and releasing an electrode reactive material are mixed and agitated in a solution containing the metal salt, followed by removing the solvent.

An addition amount of the metal salt represented by the formula (1) in a solvent according to a liquid phase method is, for instance, preferably 0.1% by weight or more and 5% by weight or less and more preferably 0.2% by weight or more and 3.0% by weight or less relative to particles of the starting raw material or particles obtained by providing a coated layer to the starting raw material as mentioned above. When the addition amount becomes smaller than the range, improvements in the discharge capacity and charge-discharge cycle characteristics and suppression of gas generation are difficult to obtain. On the other hand, when the addition amount becomes larger than the range, high energy density of the cathode active material becomes difficult to obtain and improvements in the discharge capacity and charge-discharge cycle characteristics become smaller.

Next, the prepared cathode active material is used to prepare a cathode. A method of preparing a cathode is not particularly restricted. For instance, a method where known binder and conductive agent are added to a cathode active material, a solvent is added thereto, and the solution is coated on a cathode current collector 1, a method where known binder and conductive agent are added to a cathode active material, followed by heating to coat on a cathode current collector 1, and a method where a cathode active material alone or mixed together with a conductive agent and a binder is molded to prepare a molded electrode on a cathode current collector 1 are cited without restricting thereto. More specifically, for instance, a cathode active material, a conductive agent and a binder are mixed to prepare a cathode mixture, the cathode mixture is dispersed in a solvent such as 1-methyl-2-pyrrolidone to prepare a cathode mixture slurry, the cathode mixture slurry is coated on a cathode current collector 1, the solvent is dried, followed by compression molding by use of a roll press machine to form a cathode active material layer 2, thereby a cathode is obtained. Alternatively, irrespective of whether a binder is present or not, when compression molding is applied while heating a cathode active material, a cathode having the mechanical strength is prepared.

According to another producing method of a cathode active material and a cathode, firstly, particles containing a cathode material capable of absorbing and releasing an electrode reactive material are prepared as a starting raw material, and the cathode material and a binder and a conductive agent as required are used to prepare a cathode. Subsequently, a metal salt represented by the formula (1) is coated on a surface of a cathode active material layer 2 to apply the metal salt at least partially to a surface of the cathode active material.

As a method of coating a metal salt on a surface of the cathode active material layer 2, similarly to the method where a metal salt is coated on a surface of the cathode active material, for instance, liquid phase methods such as a coating method, an immersion method or a dip coating method, and gas phase methods such as a vapor depositing method, a sputtering method or a CVD method are cited. When a metal salt layer is formed, the methods may be used singularly or in a combination of at least two kinds thereof. Among these, as the liquid phase method, a solution containing a metal salt represented by the formula (1) is preferably used to form a metal salt layer. Specifically, for instance, in the immersion method, a cathode current collector 1 on which a cathode active material layer 2 is formed is immersed in a solution containing the metal salt. The metal salt penetrates inside of the cathode active material layer 2 to be present between particles containing the cathode material, the binder and conductive agent and coat a surface of the particle. Thereby, a metal salt layer containing a metal salt on a particle surface is formed.

Next, a non-aqueous electrolyte secondary battery that uses a cathode active material and a cathode according to one exemplary embodiment will be described.

Figure 2:
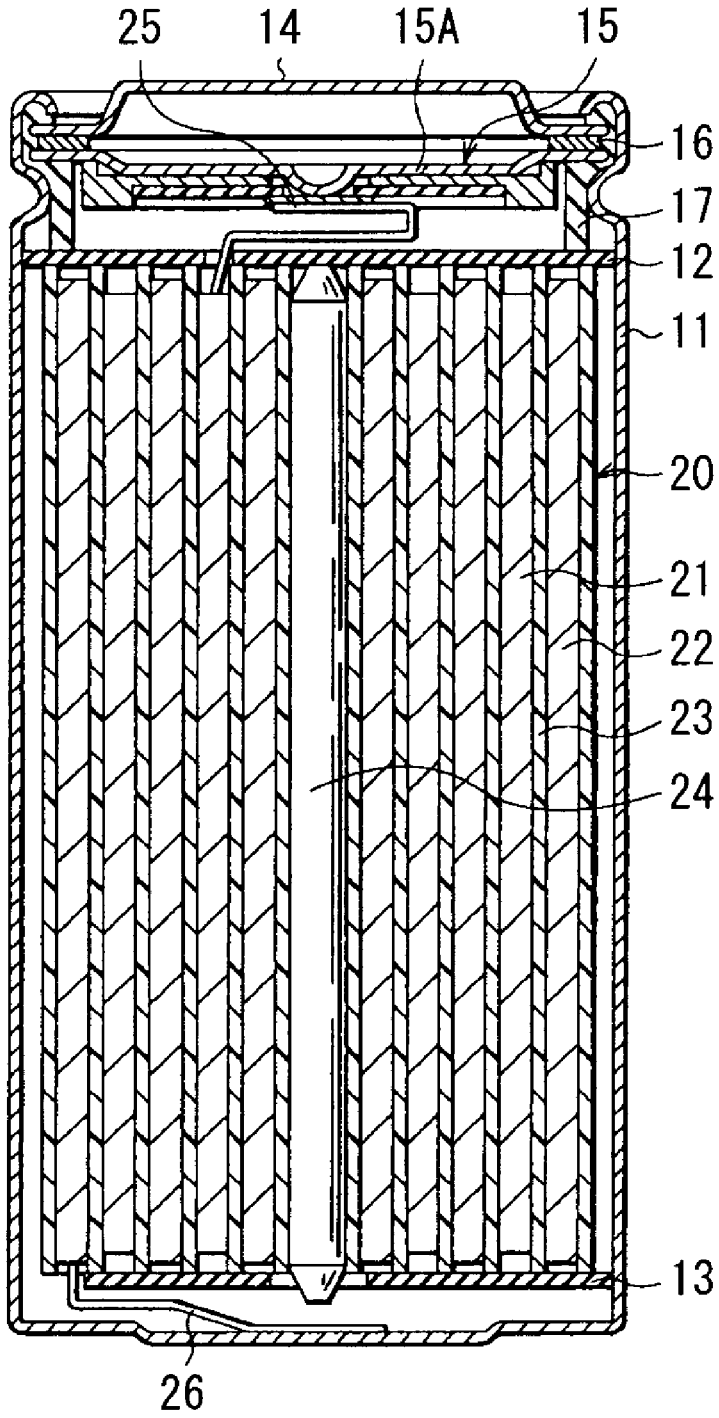
FIG. 2 is a sectional view showing a configuration of a battery according to a first example.

(4) First Example of Non-aqueous Electrolyte Secondary Battery (4-1) Configuration of Non-aqueous Electrolyte Secondary Battery FIG. 2 shows a sectional structure of a first example of the non-aqueous electrolyte secondary battery. The battery is, for instance, a non-aqueous electrolyte secondary battery such as a so-called lithium ion secondary battery that uses lithium (Li) as an electrode reactive material and capacity of an anode of which is represented by a capacity component derived from absorption and release of lithium (Li).

The battery is a so-called cylindrical battery and has a wound electrode body 20 in which a pair of a band cathode 21 and a band anode 22 are wound through a separator 23 inside of a substantially hollow cylindrical battery canister 11. The battery canister 11 is constituted of, for instance, nickel (Ni)-plated iron (Fe) and has a closed end at one end and an open end at the other end. Inside of the battery canister 11, a pair of insulating plates 12 and 13, respectively, is disposed vertical to a winding periphery surface so as to sandwich the wound electrode body 20.

At the open end of the battery canister 11, a battery cap 14, a safety valve unit 15 disposed inside of the battery cap 14 and a PTC (Positive Temperature Coefficient) device 16 are attached by caulking through a gasket 17, thereby the inside of the battery is intimately closed.

The battery cap 14 is configured of, for instance, a material same as the battery canister 11. The safety valve unit 15 is electrically connected through the PTC device 16 to the battery cap 14 and, when the inside pressure of a battery exceeds a specified value because of the internal short-circuiting or external heating, a disk plate 15A turns over to cut the electrical connection between the battery cap 14 and the wound electrode body 20. The PTC device 16 shows an increase in a resistance value when a temperature goes up to restrict a current, resulting in inhibiting extraordinary heating caused by a large current. The gasket 17 is made of, for instance, an insulating material, a surface of which being coated with asphalt.

At a center of the wound electrode body 20, for instance, a center pin 24 is inserted. To a cathode 21 of the wound electrode body 20, a cathode lead 25 made of aluminum (Al) is connected and to an anode 22 an anode lead 26 made of nickel (Ni) is connected. The cathode lead 25 is electrically connected to the battery cap 14 by welding to the safety valve unit 15, the anode lead 26 being electrically connected by welding to the battery canister 11.

[Cathode]

Figure 3:
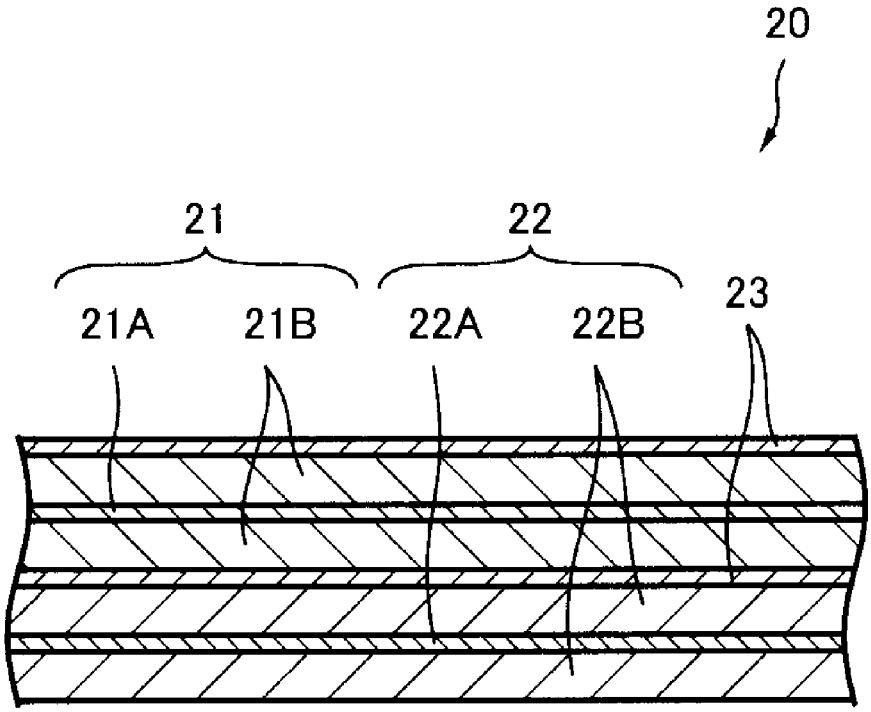
FIG. 3 is a sectional view showing by partially enlarging a wound electrode body in a battery shown in FIG. 2.

FIG. 3 is a sectional view showing by partially enlarging the wound electrode body 20 shown in FIG. 2. The cathode 21 has a configuration, for instance, same as that shown in FIG. 1, a cathode active material layer 21B being disposed on both sides of a band cathode current collector 21A. Though not shown in the drawing, a region where the cathode active material layer 21B is present only on one side of the cathode current collector 21A may be disposed. Configurations of the cathode current collector 21A and cathode active material layer 21B, respectively, are same as the configurations of the cathode current collector 1 and cathode active material layer 2.

[Anode]

As shown in FIG. 3, the anode 22 has an anode current collector 22A having a pair of facing surfaces and an anode active material layer 22B disposed on both sides or only on one side of the anode current collector 22A. A region where the anode active material layer 22B is disposed only on one side of the anode current collector 22A may be disposed. The anode current collector 22A is configured of a metal foil such as a copper (Cu) foil.

The anode active material layer 22B contains, for instance, an anode active material, and other material such as a conductive agent, a binder or a viscosity adjusting agent that do not contribute to charging may be contained as required. Examples of the conductive agent include graphite fiber, metal fiber or metal powder. Examples of the binder include fluorinated high molecule compounds such as polyvinylidene fluoride or synthetic rubbers such as styrene-butadiene rubber or ethylene propylene diene rubber. Examples of the viscosity adjusting agent include carboxymethyl cellulose.

The anode active material is configured by containing any one kind or two kinds or more of anode materials capable of electrochemically absorbing and releasing lithium (Li) at a potential of 2.0 V or less to lithium metal.

Examples of the anode material capable of absorbing and releasing lithium (Li) include a carbonaceous material, a metal compound, an oxide, a sulfide, a lithium nitride such as $LiN_3$, lithium metal, a metal forming an alloy with lithium or a high molecule material.

Examples of the carbonaceous material include hardly graphitizable carbon, readily graphitizable carbon, synthetic graphite, natural graphite, pyrolyzed carbons, cokes, graphites, glassy carbons, organic polymer sintered bodies, carbon blacks, carbon fiber or activated carbon. Among these, the cokes include pitch cokes, needle cokes or petroleum cokes. The organic polymer sintered body means those obtained by carbonizing by sintering a high molecule material such as a phenol resin or a furan resin at an appropriate temperature, a part thereof being classified in hardly graphitizable carbon or readily graphitizable carbon. Furthermore, examples of the high molecule material include polyacetylene or polypyrrole.

Among the anode materials capable of absorbing and releasing lithium (Li) like this, those having a charge-discharge potential relatively close to that of lithium metal are preferred. This is because the lower the charge-discharge potential of the anode 22 is, the more readily the higher energy density of the battery is obtained. Among those, a carbon material is preferable because the crystal structure variation caused during the charging and discharging is very small, high charge-discharge potential may be obtained and excellent cycle characteristics may be obtained. In particular, graphite is preferred because the electrochemical equivalent is large and high energy density may be obtained. Furthermore, the hardly graphitizable carbon is preferred because excellent cycle characteristics may be obtained.

As the anode material capable of absorbing and releasing lithium (Li), metallic elements or simple substances of metalloid elements capable of forming an alloy with lithium (Li), alloys or compounds are cited. These are preferred because the high energy density may be obtained. In particular, these are used preferably together with the carbon material because the high energy density and excellent cycle characteristics may be obtained. In the specification, the alloy includes, in addition to those made of at least two kinds of metallic elements, those made of at least one kind of metallic element and at least one kind of metalloid element. Examples of the texture include solid solutions, eutectics (eutectic mixtures), intermetallic compounds or those in which at least two kinds thereof coexist.

Examples of the metallic element and metalloid element like this include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the alloy and compound include those represented by a chemical formula $Ma_sMb_tLi_u$ and a chemical formula $Ma_pMc_qMd_r$. In the formulas, Ma represents at least one kind of metallic elements and metalloid elements capable of forming an alloy with lithium, Mb represents at least one kind of metallic elements and metalloid elements excluding lithium and Ma, Mc represents at least one kind of nonmetallic elements and Md represents at least one kind of the metallic elements and metalloid elements excluding Ma. Furthermore, s, t, u, p, q and r, respectively, are values satisfying $s>0$, $t\geq 0$, $u\geq 0$, $p>0$, $q>0$ and $r\geq 0$.

Among these, simple substances, alloys or compounds of 4B group metallic elements or metalloid elements in a short period periodic table are preferred, and silicon (Si) or tin (Sn), or alloys or compounds thereof are particularly preferred. These may be either crystalline or amorphous one.

Examples of the anode material capable of absorbing and releasing lithium further include oxides, sulfides or other metal compounds such as lithium nitride such as $LiN_3$. Examples of the oxide include $MnO_2$, $V_2O_5$, $V_6O_{13}$, NiS and MoS. Other than the above, examples of the oxide capable of absorbing and releasing lithium and relatively low in the potential include iron oxide, ruthenium oxide, molybdenum oxide, tungsten oxide, titanium oxide and tin oxide. Examples of the sulfide include NiS and MoS.

In the non-aqueous electrolyte secondary battery of the first example, by controlling amounts between the cathode active material and the anode active material capable of absorbing and releasing lithium, the charge capacity of the anode active material becomes larger than that of the cathode active material and thereby, even at the time of full charge, the lithium metal does not precipitate to the anode 22.

Furthermore, in the non-aqueous electrolyte secondary battery, the electrochemical equivalent of the anode material capable of absorbing and releasing lithium is set larger than the electrochemical equivalent of the cathode 21 and thereby the lithium metal does not precipitate to the anode 22 in the middle of charging.

[Separator]

The separator 23 lets lithium ions go through while isolating the cathode 21 and the anode 22 to inhibit both electrodes from short-circuiting owing to the contact thereof.

The separator 23 is constituted of a porous film of a synthetic resin such as polytetrafluoroethylene (PTFE), polypropylene (PP) or polyethylene (PE) or a ceramic porous film and may be constituted by laminating at least two kinds thereof. Among these, the porous film made of polyolefin is preferred because short-circuiting inhibiting effect is excellent and the safeness of a battery is improved owing to the shut-down effect. In particular, the polyethylene, as long as it is a resin capable of obtaining the shut-down effect in the range of 100° C. or more and 160° C. or less and having the electrochemical stability, may be copolymerized or blended with polyethylene or polypropylene. Furthermore, a separator where a porous layer of resin such as polyvinylidene fluoride (PVdF) or polytetrafluoroethylene (PTFE) is formed on a polyolefinic porous film may be used.

The separator 23 is impregnated with an electrolytic solution as a liquid electrolyte.

[Electrolyte]

As the electrolyte, a non-aqueous electrolytic solution obtained by dissolving an electrolyte salt in, for instance, a non-aqueous solvent may be used. Those that have been used in an existing non-aqueous electrolyte secondary battery may be used.

Examples of the non-aqueous solvent include propylene carbonate, ethylene carbonate, diethylene carbonate, dimethyl carbonate, 1,2-dimethoxyethane, 1,2-diethoxyethane, γ-butylolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate ester, butylate ester and propionate ester. These may be used singularly or in an arbitrary combination of at least two kinds thereof. Among these, at least one kind of ring carbonate esters such as propylene carbonate or ethylene carbonate and chain carbonate esters such as diethyl carbonate and dimethyl carbonate is preferably contained. This is because the cycle characteristics are improved. In this case, in particular, a high viscosity (high dielectric constant) solvent such as propylene carbonate or ethylene carbonate and low viscosity solvent such as diethyl carbonate or dimethyl carbonate are preferably mixed and contained. This is because the dissociation property of the electrolyte salt and the mobility of ions are improved, and thereby, a high advantage is obtained.

As an electrolyte salt that is dissolved or dispersed in the non-aqueous solvent to generate ions, for instance, a lithium salt is cited.

Examples of the lithium salt include lithium perchlorate ($LiClO_4$), lithium hexafluoroarsenate ($LiAsF_6$), lithium hexafluorophosphate ($LiPF_6$), lithium tetrafluoroborate ($LiBF_4$), $LiB(C_6H_5)_4$, $CH_3SO_3Li$, $CF_3SO_3Li$, LiCl, and LiBr. These may be used singularly or in a combination of at least two kinds thereof. Among these, lithium hexafluorophosphate ($LiPF_6$) is preferred because high ionic conductivity may be obtained and the cycle characteristics may be improved.

A content of the electrolyte salt like this is, for instance, preferably in the range of 0.1 mol to 3.0 mol and more preferably in the range of 0.5 mol to 2.0 mol relative to 1 L of the solvent. This is because, within the range, higher ionic conductivity may be obtained.

In the non-aqueous electrolyte secondary battery of the first example, when the battery is charged, lithium ions are released from, for instance, the cathode active material layer 21B and absorbed through the electrolytic solution by the anode active material layer 22B. Furthermore, when the battery is discharged, lithium ions are released from, for instance, the anode active material layer 22b and absorbed through the electrolytic solution by the cathode active material layer 21B.

The upper limit charge voltage of the non-aqueous electrolyte secondary battery may be, for instance, 4.20 V, however, it is preferable that the upper limit charge voltage is designed to be in the range of 4.25 V or more to 4.80 V or less higher than 4.20 V and more preferably in the range of 4.35 V to 4.65 V. Furthermore, the lower limit discharge voltage is preferably set in the range of 2.00 V to 3.30 V. For instance, when a battery voltage is set at 4.25 V or more, in comparison with a battery of 4.2 V, with the same cathode active material, a release amount of lithium per unit mass increases, corresponding thereto, amounts of the cathode active material and the anode active material are adjusted, thereby high energy density is obtained. According to one exemplary embodiment, a film containing a metal salt represented by the formula (1) is formed on a cathode active material. Accordingly, excellent cycle characteristics may be obtained even at a high battery voltage and the gas may be inhibited from generating inside of the battery.

(4-2) Producing Method of Non-aqueous Electrolyte Secondary Battery

In the next place, an example of a producing method of a non-aqueous electrolyte secondary battery according to one embodiment will be described.

In the beginning, a cathode 21 is obtained according to a method similar to the producing method of a cathode active material and a cathode of one exemplary embodiment.

The anode 22 is produced according to a method where known binder and conductive agent are added to an anode active material, a solvent is further added thereto, and the solution is coated on an anode current collector 22A, a method where known binder and conductive agent are added to an anode active material, followed by heating and coating on the anode current collector 22A, and a method where an anode active material alone or further mixed with a conductive agent and a binder is molded to prepare a molded electrode on the anode current collector 22A are cited without restricting thereto. More specifically, for instance, an anode active material and a binder are mixed to prepare an anode mixture, the anode mixture is dispersed in a solvent such as 1-methyl-2-pyrrolidone to prepare an anode mixture slurry, the anode mixture slurry is coated on the anode current collector 22A, the solvent is dried, followed by compression molding by use of a roll press machine to form an anode active material layer 22B, thereby an anode 22 is obtained. Alternatively, irrespective of whether a binder is present or not, when compression molding is applied while heating the anode active material, an anode having the mechanical strength is prepared as well.

In the next place, a cathode lead 25 is attached to the cathode current collector 21A by welding and an anode lead 26 is attached to the anode current collector 22A by welding. Thereafter, the cathode 21 and anode 22 are wound through a separator 23, a tip end of the cathode lead 25 is welded to a safety valve unit 15 and a tip end of the anode lead 26 is welded to a battery canister 11, and the wound cathode 21 and anode 22 are stored inside of the battery canister 11 with the wound cathode 21 and anode 22 sandwiched between a pair of insulating plates 12 and 13. After the cathode 21 and anode 22 are stored inside of the battery canister 11, an electrolyte is charged inside of the battery canister 11 to impregnate in the separator 23. Thereafter, the battery cap 14, safety valve unit 15 and PTC device 16 are caulked through the gasket 17 to an open end of the battery canister 11 to fix. Thereby, a secondary battery shown in FIG. 2 is prepared.

Figure 4:
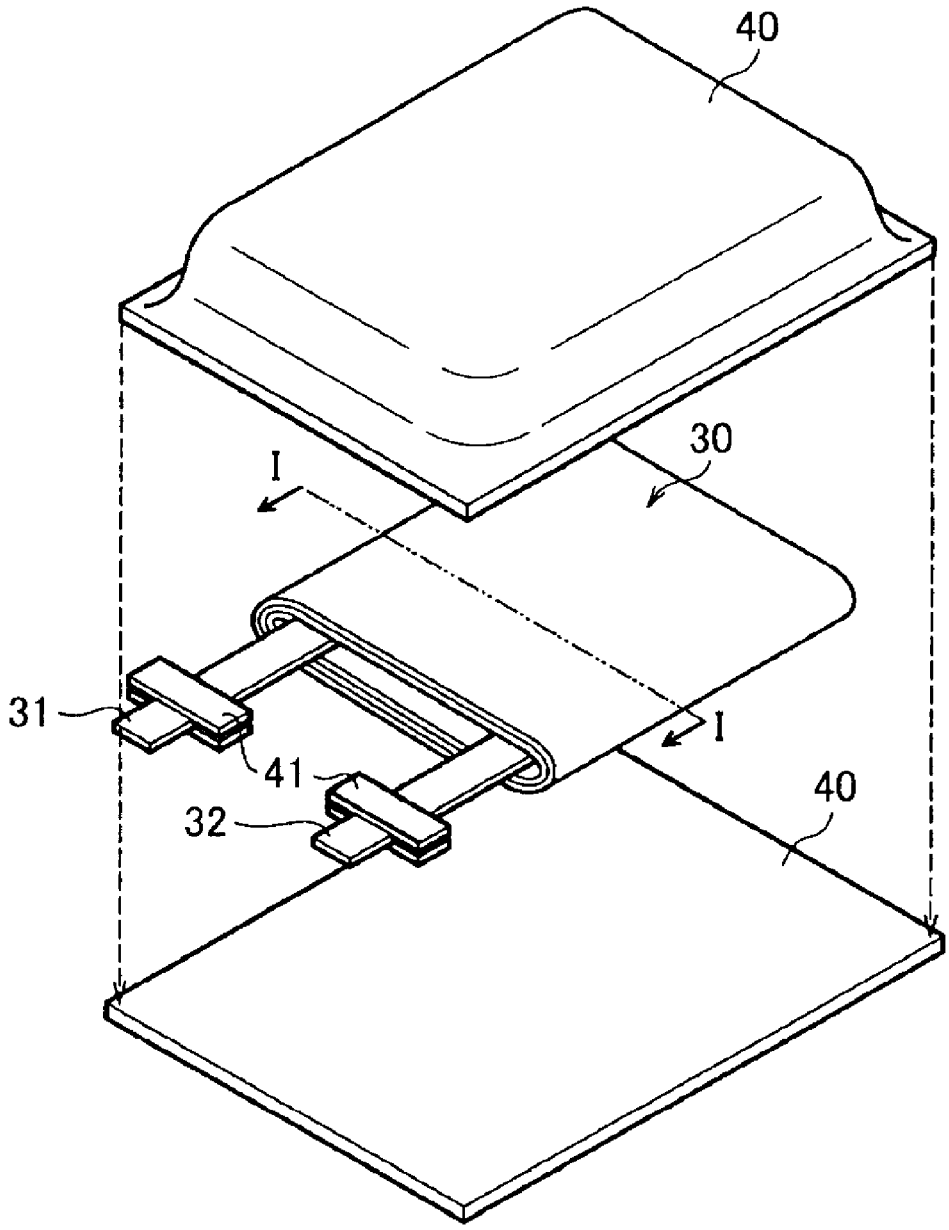
FIG. 4 is a sectional view showing a configuration of a battery according to a second example.

(5) Second Example of Non-aqueous Electrolyte Secondary Battery (5-1) Configuration of Non-aqueous Electrolyte Secondary Battery FIG. 4 shows a configuration of a non-aqueous electrolyte secondary battery according to a second example. The non-aqueous electrolyte secondary battery is one that is called a laminate film type and stores a wound electrode body 30 to which a cathode lead 31 and an anode lead 32 are attached inside of a film-like exterior member 40.

The cathode lead 31 and anode lead 32 are extracted, for instance, in the same direction, respectively, from the inside of the exterior member 40 toward the outside thereof. The cathode lead 31 and anode lead 32 are constituted of a metallic material such as aluminum, copper, nickel or stainless steel and formed in a thin sheet or mesh, respectively.

[Exterior Member]

The exterior member 40 is constituted of a rectangular aluminum laminate film obtained by laminating, for instance, a nylon film, an aluminum foil and a polyethylene film in this order. In the exterior member 40, for instance, a polyethylene film side and the wound electrode body 30 are disposed so as to face each other and the respective outer peripheries are fused or adhered closely with an adhesive. A contact film 41 is inserted between the exterior member 40 and the cathode lead 31 and between the exterior member 40 and the anode lead 32 so as to inhibit external air from intruding. The contact film 41 is constituted of a material having adherence to the cathode lead 31 and anode lead 32, for instance a polyolefin resin such as polyethylene, polypropylene, modified polyethylene or modified polypropylene.

The exterior member 40 may be constituted of, in place of the aluminum laminate film, a laminate film having another structure, a high molecule film such as polypropylene or a metal film.

[Wound Electrode Body]

Figure 5:
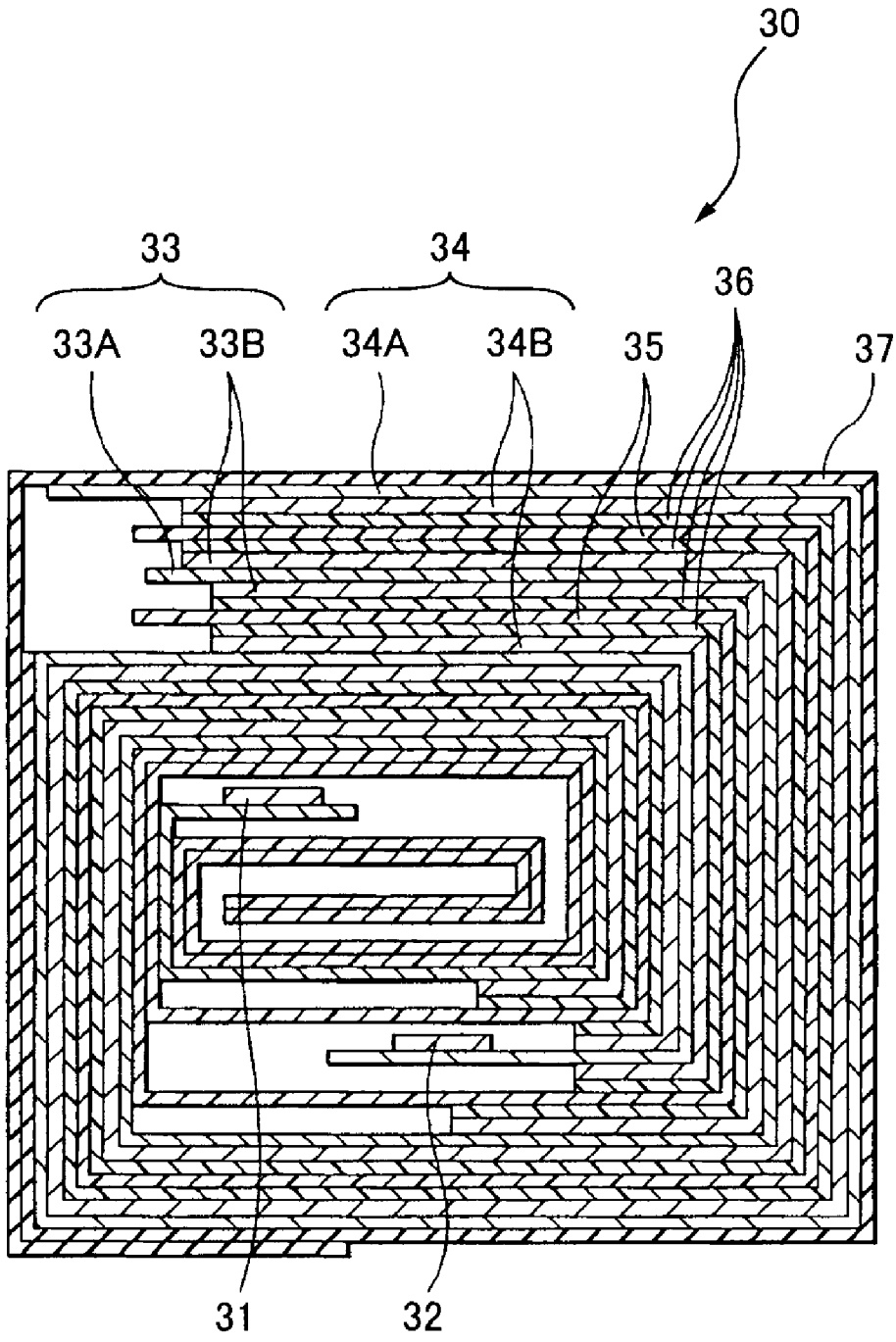
FIG. 5 is a sectional view along an I-I line of the wound electrode body shown in FIG. 4.

FIG. 5 shows a sectional structure along an I-I line of the wound electrode body 30 shown in FIG. 4. The wound electrode body 30 is formed by laminating the cathode 33 and the anode 34 through the separator 35 and the electrolyte layer 36, followed by winding, the outermost periphery being protected with a protective tape 37.

The cathode 33 has a structure where a cathode active material layer 33B is disposed on one side or both sides of the cathode current collector 33A. The anode 34 has a structure where an anode active material layer 34B is disposed on one side or both sides of the anode current collector 34A, the anode active material layer 34B and cathode active material layer 33B being disposed so as face each other. The cathode current collector 33A, cathode active material layer 33B, anode current collector 34A, anode active material layer 34B and separator 35 have configurations same as that of the cathode current collector 21A, cathode active material layer 21B, anode current collector 22A, anode active material layer 22B and separator 23 of the first exemplary embodiment, respectively.

The electrolyte layer 36 contains an electrolytic solution and a high molecule compound that is a retainer for retaining the electrolytic solution and is in a gel state. The gel electrolyte is preferred because it is capable of obtaining high ionic conductivity and of inhibiting a battery from leaking a liquid. The configuration of the electrolytic solution (that is, solvent, electrolyte salt and so on) is same as the secondary battery of the first exemplary embodiment.

As the high molecule material, a variety of high molecules capable of gelling by absorbing the electrolytic solution may be used. Specific examples thereof include fluorinated high molecules such as poly(vinylidene fluoride) or poly(vinylidene fluoride-co-hexafluoropropylene); ether-based high molecules such as poly(ethylene oxide) or crosslinked body thereof; and poly(acrylonitrile). In particular, from the viewpoint of redox stability, fluorinated high molecules such as a polymer of vinylidene fluoride are desirably used.

An operation and advantage of the non-aqueous electrolyte secondary battery of the second example are same as that of the non-aqueous electrolyte secondary battery of the first example. According to the second example, the gas is inhibited from generating inside of the battery. Accordingly, the non-aqueous electrolyte secondary battery may be inhibited from expanding and deforming.

(5-2) Producing Method of Non-aqueous Electrolyte Secondary Battery

The non-aqueous electrolyte secondary battery of the second example is produced according to, for instance, three kinds of producing methods shown below.

According to a first producing method, in the beginning, on each of cathode 33 and anode 34, a precursor solution containing an electrolytic solution, a high molecule compound and a mixed solvent is coated and the mixed solvent is vaporized to form an electrolyte layer 36. Thereafter, a cathode lead 31 is attached to an end of a cathode current collector 33A by welding and an anode lead 32 is attached to an end of an anode current collector 34A by welding. Further thereafter, the cathode 33 on which an electrolyte layer 36 is formed and the anode 34 are laminated through a separator 35 to form a laminated body, followed by winding the laminated body in a longer direction, further followed by adhering a protective tape 37 to the outermost periphery to form a wound electrode body 30. Finally, the wound electrode body 30 is sandwiched between, for instance, an exterior member 40 and outer peripheries of the exterior member 40 are closely adhered by thermal fusion to encapsulate. At that time, a contact film 41 is inserted between the cathode lead 31 and anode lead 32 and the exterior member 40. Thereby, the non-aqueous electrolyte secondary battery shown in FIGS. 4 and 5 is completed.

According to the second producing method, in the beginning, a cathode 33 and an anode 34 are prepared as mentioned above, after a cathode lead 31 and an anode lead 32 are attached to the cathode 33 and the anode 34 respectively, the cathode 33 and anode 34 are laminated through a separator 35 and wound, a protective tape 37 is adhered to the outermost periphery, thereby a wound body that is a precursor of a wound electrode body 30 is formed. In the next place, with the wound body wrapped by an exterior members 40, outer peripheries excluding one side thereof are heat sealed to form a bag and thereby the wound body is stored inside of the exterior member 40. Subsequently, a composition for electrolyte containing an electrolytic solution, a monomer that is a raw material of a high molecule compound, a polymerization initiator and other materials such as a polymerization inhibitor as required is prepared and injected inside of the exterior member 40.

After the composition for electrolyte is injected, an opening of the exterior member 40 is heat sealed under a vacuum atmosphere to hermetically seal. Then, a high molecule compound is formed by heating and polymerizing the monomer and thereby a gel-like electrolyte layer 36 is formed. Thereby, a non-aqueous electrolyte secondary battery shown in FIGS. 4 and 5 is obtained.

According to the third producing method, a wound body is formed and stored inside of the exterior member 40 in a manner similar to that of the first producing method except that a separator 35 on both sides of which a high molecule compound is coated is used. As the high molecule compound coated on the separator 35, polymers mainly made of vinylidene fluoride, that is, homopolymers, copolymers and multipolymers are cited. Specifically, bicopolymers made of two of polyvinylidene fluoride, vinylidene fluoride and hexafluoropropylene and tricopolymers made of vinylidene fluoride, hexafluoropropylene and chlorotrifluoroethylene are cited. The high molecule compound may contain one kind or two kinds or more of other high molecule compounds together with the polymer made of the vinylidene fluoride.

Then, an electrolytic solution and so on are adjusted and injected inside of the exterior member 40 and an opening of the exterior member 40 is heat sealed to hermetically seal. Finally, the exterior member 40 is heated under weight so as to closely bond the separator 35 through the high molecule compound to the cathode 33 and anode 34. Thereby, the high molecule compound is impregnated with the electrolytic solution and gelated to form an electrolyte layer 36 and thereby a non-aqueous electrolyte secondary battery comes to completion.

According to the third producing method, in comparison with the second producing method, the swelling resistance is improved. Furthermore, according to the third producing method, in comparison with the second producing method, the monomer that is a raw material of the high molecule compound and the solvent hardly remain in the electrolyte layer 36 and, since a forming step of the high molecule compound is excellently controlled, sufficient adhesiveness is obtained between the cathode 33, anode 34 and separator 35 and the electrolyte layer 36.

An improvement behavior of the battery characteristics of the non-aqueous electrolyte secondary batteries according to the first and second examples is not clear. However, a mechanism shown below is assumed.

In a battery charged to 4.20 V or more, a cathode active material generates a high electromotive force. Accordingly, an electrolyte in contact with the cathode active material is under a strong oxidizing environment. Therefrom, it is considered that a metal component is eluted from the cathode active material that became unstable by extraction of much lithium (Li) to deteriorate the cathode active material or generate an oxidative decomposition of the electrolyte. Then, it is assumed that an eluted metal component is reductively precipitated on an anode side to cover an anode surface to disturb lithium from being absorbed and released, resulting in causing deterioration of the charge-discharge cycle characteristics. Furthermore, it is considered also that the electrolyte is oxidatively decomposed on a cathode to generate gas and a film is generated on the cathode to result in swelling a battery or raising impedance.

On the other hand, in the cathode active material according to one exemplary embodiment, a film represented by the formula (1) is formed on a particle surface. The film is considered stable to a high electromotive force of the cathode. As the result, it is considered that the cathode and an electrolytic solution are inhibited from reacting to inhibit the electrolytic solution from decomposing and a film low in the lithium ion permeability like LiF from generating. Accordingly, it is considered that the cathode active material of the one exemplary embodiment contributes to combine realization of high capacity by making a charge voltage higher, an improvement in the charge-discharge cycle characteristics and suppression of the swelling of the battery caused by gas generation.

The non-aqueous electrolyte secondary batteries according to the first and second examples are light in weight, high in the capacity and high in the energy density. Accordingly, the non-aqueous electrolyte secondary batteries are widely applicable to portable small size electronic devices such as video cameras, note personal computers, word processors, radio cassette recorders and portable telephones.

EXAMPLES

In what follows, the present application will be specifically described with reference to examples. However, the invention is not restricted only to the examples.

Example 1

A preparing method of a cathode active material is shown below. In the beginning, 100 parts by weight of lithium cobalt oxide having an average composition of $LiCo_{0.98}Al_{0.01}Mg_{0.01}O_2$ and an average particle diameter measured by laser scattering method of 13 μm and 1 parts by weight of lithium 2-hydroxypropane sulfonate were weighed and agitated for 1 hr in 100 ml of pure water. After the agitation, a water content was removed by use of an evaporator, followed by drying at 120° C. for 12 hr in an oven, thereby a cathode active material where lithium 2-hydroxypropane sulfonate was coated on lithium cobalt oxide was obtained.

The non-aqueous electrolyte secondary battery shown in FIGS. 4 and 5 was prepared as described below with thus-obtained cathode active material. In the beginning, 98% by weight of the cathode active material, 0.8% by weight of amorphous carbon powder (Ketchen black) as a conductive agent and 1.2% by weight of polyvinylidene fluoride (PVdF) as a binder were mixed to prepare a cathode mixture. The cathode mixture was dispersed in N-methyl-2-pyrrolidone (NMP) to prepare a cathode mixture slurry and the cathode mixture slurry was coated uniformly on both sides of a cathode current collector 33A made of a 20 μm thick band-like aluminum foil. The obtained coated matter was dried in warm air, followed by compression molding by use of a roll press thereby a cathode active material layer 33B was formed. Thereafter, an aluminum cathode lead 31 was attached to one end of the cathode current collector 33A.

An anode 34 was prepared as shown below. In the beginning, 90% by weight of graphite powder as an anode active material and 10% by weight of polyvinylidene fluoride (PVdF) as a binder were mixed to prepare an anode mixture. The anode mixture was dispersed in N-methyl-2-pyrrolidone (NMP) to prepare an anode mixture slurry and the anode mixture slurry was coated uniformly on both sides of an anode current collector made of a 15 μm thick band-like copper foil, followed by molding with a heat press thereby an anode active material layer 34B was formed. Thereafter, a nickel anode lead 32 was attached to one end of the anode current collector 34A.

A separator 35 was prepared as shown below. Firstly, N-methyl-2-pyrrolidone (NMP) was added to polyvinylidene fluoride (PVdF) having a weight-average molecular weight of 150000 at a weight ratio of PVdF:NMP=10:90, followed by thoroughly dissolving, thereby N-methyl-2-pyrrolidone (NMP) 10% by weight solution of polyvinylidene fluoride (PVdF) was prepared.

In the next place, the prepared slurry was coated on a 7 μm-thick microporous film that is a mixture of polyethylene (PE) and polypropylene (PP) and used as a base material. Then, the slurry-coated microporous film was subjected to phase separation in a water bath, followed by drying in hot air, thereby a separator 35 made of a microporous film having a 4 μm thick PVdF microporous layer was obtained.

In the next place, the separator 35, cathode 33 and anode 34 were laminated in an order of the anode 34, separator 35, cathode 33 and separator 35, followed by winding many times, thereby a wound electrode body 30 was prepared. Then, with the wound electrode body 30 wrapped by an exterior member 40 made of a dampproof aluminum laminated film, outer peripheries excluding one side thereof were heat sealed to form a bag and the wound electrode body 30 was stored inside of the exterior member 40. Subsequently, an electrolytic solution was injected inside of the exterior member 40. As the electrolytic solution, a non-aqueous electrolytic solution obtained by dissolving $LiPF_6$ at a concentration of 1 mol/dm$^3$ in a mixed solution obtained by mixing ethylene carbonate (EC) and diethylene carbonate (DEC) at a volume ratio of 1:1 was used.

Thereafter, an opening of the exterior member 40 was heat sealed under reduced pressure, followed by vacuum sealing and thermal compression bonding, and thereby a plat plane non-aqueous electrolyte secondary battery having a substantial dimension of 34 mm×50 mm×3.8 mm was prepared.

Battery characteristics of the resulted non-aqueous secondary battery were evaluated as shown below.

(a) Initial Capacity

The resulted non-aqueous electrolyte secondary battery was subjected to the constant current and constant voltage charging under conditions of an environmental temperature of 45° C., a charge voltage of 4.20 V, a charging current of 800 mA and a charging time of 2.5 hr, followed by discharging at a discharging current of 400 mA and an end voltage of 3.0 V, thereby an initial capacity was measured.

(b) Charge-discharge Cycle Characteristics

The charge and discharge were repeated under the same conditions as the case where the initial capacity was obtained, the discharging capacity at the 200$^{th}$ cycle was measured, followed by obtaining a capacity retention rate to the initial capacity.

(c) Increase Rate of Cell Thickness

The non-aqueous electrolyte secondary battery of which initial capacity was obtained was subjected to the constant current and constant voltage charging under the conditions of a charge voltage of 4.20 V, a charging current of 800 mA and a charging time of 2.5 hr, followed by preserving at 90° C. for 4 hr, and an increase rate of a cell thickness before and after the preservation was obtained from {(cell thickness after preservation−cell thickness before preservation)/cell thickness before preservation}×100.

Example 2

The (a) initial capacity, (b) charge-discharge cycle characteristics and (c) increase rate of the cell thickness were evaluated in a manner similar to example 1 except that, in the evaluation of the battery characteristics, the charge voltage was set at 4.35 V.

Example 3

The (a) initial capacity, (b) charge-discharge cycle characteristics and (c) increase rate of the cell thickness were evaluated in a manner similar to example 1 except that, in the evaluation of the battery characteristics, the charge voltage was set at 4.40 V.

Example 4

The (a) initial capacity, (b) charge-discharge cycle characteristics and (c) increase rate of the cell thickness were evaluated in a manner similar to example 1 except that, in the evaluation of the battery characteristics, the charge voltage was set at 4.50 V.

Example 5

A non-aqueous electrolyte secondary battery was prepared in a manner similar to example 3 except that, when a cathode active material was prepared, lithium 2-hydroxypropane sulfonate was weighed so as to be 0.2 parts by weight to 100 parts by weight of lithium cobalt oxide, and the battery characteristics were evaluated.

Example 6

A non-aqueous electrolyte secondary battery was prepared in a manner similar to example 3 except that, when a cathode active material was prepared, lithium 2-hydroxypropane sulfonate was weighed so as to be 0.5 parts by weight to 100 parts by weight of lithium cobalt oxide, and the battery characteristics were evaluated.

Example 7

A non-aqueous electrolyte secondary battery was prepared in a manner similar to example 3 except that, when a cathode active material was prepared, lithium 2-hydroxypropane sulfonate was weighed so as to be 3.0 parts by weight to 100 parts by weight of lithium cobalt oxide, and the battery characteristics were evaluated.

Example 8

A non-aqueous electrolyte secondary battery was prepared in a manner similar to example 3 except that, when a cathode active material was prepared, lithium 2-hydroxypropane sulfonate was weighed so as to be 5.0 parts by weight to 100 parts by weight of lithium cobalt oxide, and the battery characteristics were evaluated.

Example 9

A non-aqueous electrolyte secondary battery was prepared in a manner similar to example 3 except that lithium 2-hydroxypropane sulfonate in example 3 was changed to lithium 2-hydroxypropene sulfonate, and the battery characteristics were evaluated.

Example 10

In the beginning, lithium carbonate ($Li_2CO_3$), manganese carbonate ($MnCO_3$) and ammonium phosphate (($NH_4$)$H_2PO_4$) were weighed respectively so as to be a mole ratio of lithium (Li):manganese (Mn):phosphorus (P)=3:3:2 and mixed. The resulted mixed powder was weighed so as to be 2 parts by weight to 100 parts by weight of lithium cobalt oxide having an average composition of $LiCo_{0.98}Al_{0.01}Mg_{0.01}O_2$ and an average particle diameter measured by laser scattering method of 13 μm. Then, the mixed powder and lithium cobalt oxide were processed by use of a mechanochemical device for 1 hr to coat $Li_2CO_3$, $MnCO_3$ and ($NH_4$)$H_2PO_4$ on a surface of lithium cobalt oxide and thereby a sintering precursor was prepared. The sintering precursor was heated at a speed of 3° C./min and held at 900° C. for 3 hr, followed by gradually cooling, and, thereby powder where manganese (Mn) and phosphorus (P) were coated on a surface of lithium cobalt oxide was obtained.

When the resulted powder was observed with a scanning electron microscope (SEM) provided with an energy dispersive X-ray diffractometer (EDX) (hereinafter, referred to as SEM/EDX), it was confirmed that manganese (Mn) is distributed over an entire surface of a particle of lithium cobalt oxide and phosphorus (P) is scattered locally on a surface of lithium cobalt oxide particle.

A powder X-ray diffraction (XRD) pattern was measured with long wavelength CuKα with respect to the powder and thereby a diffraction peak of $Li_3PO_4$ was confirmed in addition to a diffraction peak corresponding to $LiCoO_2$ having a layered rock salt structure.

Furthermore, when an element ratio of particle surface was measured by scanning X-ray electron spectroscopy for chemical analysis (ESCA: trade name: Quantera SXM, manufactured by Ulvac Phi Co., Ltd.), Co/(Co+Mn+P) was found to be 0.40.

A non-aqueous electrolyte secondary battery was prepared in a manner similar to example 3 except that lithium cobalt oxide particles coated as mentioned above were used, and the battery characteristics thereof were evaluated.

Example 11

In the beginning, lithium carbonate ($Li_2CO_3$), nickel hydroxide ($Ni(OH)_2$) and manganese carbonate ($MnCO_3$) were weighed respectively so as to be a mole ratio of $Li_2CO_3$:$Ni(OH)_2$:$MnCO_3$=1.08:1:1 (corresponding to ($Li_{1.08}Ni_{0.5}Mn_{0.5}O_2$)), followed by pulverizing in wet process by use of a ball mill unit until an average particle diameter of 1 μm or less was achieved, further followed by drying at 70° C. under reduced pressure. The resulted mixed powder was weighed so as to be 5 parts by weight to 100 parts by weight of lithium cobalt oxide having an average composition of $LiCo_{0.98}Al_{0.01}Mg_{0.01}O_2$ and an average particle diameter measured by laser scattering method of 13 μm. Then, the mixed powder and lithium cobalt oxide were processed by use of a mechanochemical device for 1 hr to coat $Li_2CO_3$, $Ni(OH)_2$ and $MnCO_3$ on a surface of lithium cobalt oxide and thereby a sintering precursor was prepared. The sintering precursor was heated at a speed of 3° C./min and held at 800° C. for 3 hr, followed by gradually cooling, and, thereby powder where manganese (Mn) and nickel (Ni) were coated on a surface of lithium cobalt oxide was obtained.

The resulted powder was analyzed by use of an atomic absorption analysis method and found to have a composition of $LiCo_{0.94}Ni_{0.02}Mn_{0.02}Al_{0.01}Mg_{0.01}O_2$. A particle diameter thereof was measured by use of a laser diffraction method and found to be 13.5 μm by average particle diameter.

Furthermore, when the powder was observed by SEM/EDX, it was observed that a nickel manganese metal compound having a particle diameter in the range of substantially 0.1 to 5 μm was attached onto a surface of lithium cobalt oxide and nickel (Ni) and manganese (Mn) were present substantially uniformly over an entire surface.

A non-aqueous electrolyte secondary battery was prepared in a manner similar to example 3 except that lithium cobalt oxide particles coated as mentioned above were used, and the battery characteristics thereof were evaluated.

Comparative Example 1

A secondary battery was prepared in a manner similar to example 1 except that lithium cobalt oxide that was not coated by lithium 2-hydroxypropane sulfonate was used as the cathode active material, and the battery characteristics thereof were evaluated.

Comparative Example 2

The (a) initial capacity, (b) charge-discharge cycle characteristics and (c) increase rate of cell thickness were evaluated in a manner similar to comparative example 1 except that the charge voltage was set at 4.35 V in the evaluation of the battery characteristics.

Comparative Example 3

The (a) initial capacity, (b) charge-discharge cycle characteristics and (c) increase rate of cell thickness were evaluated in a manner similar to comparative example 1 except that the charge voltage was set at 4.40 V in the evaluation of the battery characteristics.

Comparative Example 4

The (a) initial capacity, (b) charge-discharge cycle characteristics and (c) increase rate of cell thickness were evaluated in a manner similar to comparative example 1 except that the charge voltage was set at 4.50 V in the evaluation of the battery characteristics.

Comparative Example 5

A secondary battery was prepared in a manner similar to example 10 except that lithium cobalt oxide that was not coated by lithium 2-hydroxypropane sulfonate was used as the cathode active material, and the battery characteristics thereof were evaluated.

Comparative Example 6

A secondary battery was prepared in a manner similar to example 11 except that lithium cobalt oxide that was not coated by lithium 2-hydroxypropane sulfonate was used as the cathode active material, and the battery characteristics thereof were evaluated.

Comparative Example 7

A non-aqueous electrolyte secondary battery was prepared in a manner similar to example 3 except that lithium 2-hydroxypropane sulfonate in example 3 was replaced with lithium carbonate, and the battery characteristics thereof were evaluated.

In Table 1 shown below, evaluation results of the battery characteristics of Examples 1 through 11 and Comparative Examples 1 through 7 are shown together.

TABLE 1

| | POSITIVE ELECTRODE ACTIVE MATERIAL (PARTICLES) | FILM MATERIAL | ADDITION AMOUNT OF FILM MATERIAL [PARTS BY WEIGHT] | INITIAL CAPACITY [mAh] | CAPACITY RETENTION RATE [%] | THICKNESS INCREASE RATE [%] | VOLTAGE [V] |
|---|---|---|---|---|---|---|---|
| EXAMPLE 1 | $LiCo_{0.98}Al_{0.01}Mg_{0.01}O_2$ | LITHIUM 2-HYDROXYPROPANE SULFONATE | 1.0 | 720 | 85 | 3 | 4.20 |
| EXAMPLE 2 | $LiCo_{0.98}Al_{0.01}Mg_{0.01}O_2$ | LITHIUM 2-HYDROXYPROPANE SULFONATE | 1.0 | 770 | 81 | 5 | 4.35 |
| EXAMPLE 3 | $LiCo_{0.98}Al_{0.01}Mg_{0.01}O_2$ | LITHIUM 2-HYDROXYPROPANE SULFONATE | 1.0 | 800 | 74 | 11 | 4.40 |
| EXAMPLE 4 | $LiCo_{0.98}Al_{0.01}Mg_{0.01}O_2$ | LITHIUM 2-HYDROXYPROPANE SULFONATE | 1.0 | 840 | 59 | 42 | 4.50 |
| EXAMPLE 5 | $LiCo_{0.98}Al_{0.01}Mg_{0.01}O_2$ | LITHIUM 2-HYDROXYPROPANE SULFONATE | 0.2 | 800 | 73 | 25 | 4.40 |
| EXAMPLE 6 | $LiCo_{0.98}Al_{0.01}Mg_{0.01}O_2$ | LITHIUM 2-HYDROXYPROPANE SULFONATE | 0.5 | 800 | 75 | 16 | 4.40 |
| EXAMPLE 7 | $LiCo_{0.98}Al_{0.01}Mg_{0.01}O_2$ | LITHIUM 2-HYDROXYPROPANE SULFONATE | 3.0 | 780 | 70 | 9 | 4.40 |
| EXAMPLE 8 | $LiCo_{0.98}Al_{0.01}Mg_{0.01}O_2$ | LITHIUM 2-HYDROXYPROPANE SULFONATE | 5.0 | 700 | 54 | 4 | 4.40 |
| EXAMPLE 9 | $LiCo_{0.98}Al_{0.01}Mg_{0.01}O_2$ | LITHIUM 2-HYDROXYPROPANE SULFONATE | 1.0 | 780 | 68 | 12 | 4.40 |
| EXAMPLE 10 | $LiCo_{0.98}Al_{0.01}Mg_{0.01}O_2$/ $L_2CO_3 + MnCO_3 + (NH_4)_2HPO_4$ | LITHIUM 2-HYDROXYPROPANE SULFONATE | 1.0 | 800 | 80 | 5 | 4.40 |

TABLE 1-continued

| | POSITIVE ELECTRODE ACTIVE MATERIAL (PARTICLES) | FILM MATERIAL | ADDITION AMOUNT OF FILM MATERIAL [PARTS BY WEIGHT] | INITIAL CAPACITY [mAh] | CAPACITY RETENTION RATE [%] | THICKNESS INCREASE RATE [%] | VOLTAGE [V] |
|---|---|---|---|---|---|---|---|
| EXAMPLE 11 | $LiCo_{0.98}Al_{0.01}Mg_{0.01}O_2$/ $L_2CO_3 + Ni(OH)_2 + MnCO_3$ | LITHIUM 2-HYDROXYPROPANE SULFONATE | 1.0 | 800 | 75 | 14 | 4.40 |
| COMPARATIVE EXAMPLE 1 | $LiCo_{0.98}Al_{0.01}Mg_{0.01}O_2$ | — | — | 720 | 82 | 10 | 4.20 |
| COMPARATIVE EXAMPLE 2 | $LiCo_{0.98}Al_{0.01}Mg_{0.01}O_2$ | — | — | 770 | 66 | 24 | 4.35 |
| COMPARATIVE EXAMPLE 3 | $LiCo_{0.98}Al_{0.01}Mg_{0.01}O_2$ | — | — | 800 | 54 | 38 | 4.40 |
| COMPARATIVE EXAMPLE 4 | $LiCo_{0.98}Al_{0.01}Mg_{0.01}O_2$ | — | — | 840 | 38 | 80 | 4.50 |
| COMPARATIVE EXAMPLE 5 | $LiCo_{0.98}Al_{0.01}Mg_{0.01}O_2$/ $L_2CO_3 + MnCO_3 + (NH_4)2HPO_4$ | — | — | 800 | 80 | 9 | 4.40 |
| COMPARATIVE EXAMPLE 6 | $LiCo_{0.98}Al_{0.01}Mg_{0.01}O_2$/ $L_2CO_3 + Ni(OH)_2 + MnCO_3$ | — | — | 800 | 82 | 35 | 4.40 |
| COMPARATIVE EXAMPLE 7 | $LiCo_{0.98}Al_{0.01}Mg_{0.01}O_2$ | LITHIUM CARBONATE | 1.0 | 790 | 40 | 300 | 4.40 |

As obvious by comparing, for instance, examples 1 through 4 and comparative examples 1 through 4 respectively in Table 1, when a film containing a metal salt was formed on a particle surface, a decrease in the capacity retention rate and an increase in the thickness increase rate were inhibited from occurring. Furthermore, it was found that as the charge voltage goes up, while the energy density increases to be high in the initial capacity, the capacity retention rate decreases and the thickness increase rate increases. However, when a film containing a metal salt is formed, a decrease in the capacity retention rate and an increase in the thickness increase rate are inhibited from occurring.

The capacity retention rate was substantially same between example 8 and comparative example 3. Accordingly, it was found that the upper limit of an addition amount of a film material was preferably less than 5.0 parts by weight to 100 parts by weight of particles. In particular, it was found from examples 3 and 5 through 8 that when the addition amount of the film material was in the range of 0.2 parts by weight or more and 3.0 parts by weight or less to 100 parts by weight of particles, a high effect was obtained.

Furthermore, in comparative example 7 where a film containing lithium carbonate was formed, the capacity retention rate was lower and the thickness increase rate was remarkably larger than comparative example 3 where the film was not disposed. This is considered that, in a film containing lithium carbonate, the gas generation from the cathode increases owing to lithium carbonate on a particle surface and the cell is distorted by the gas generation.

Still furthermore, by comparing example 10 and comparative example 5 and example 11 and comparative example 6, it is found that when a film containing a metal salt is formed to a particle where a coated layer containing manganese, nickel or phosphorus is formed, higher effect to an improvement of the capacity retention rate and suppression of the increase rate of the thickness is obtained.

From the results mentioned above, it was found that when a film containing a metal salt represented by the formula (1) such as lithium 2-hydroxypropane sulfonate or lithium 2-hydroxypropene sulfonate is formed on a particle containing a cathode material capable of absorbing and releasing an electrode reactive material, the initial capacity and capacity retention rate are combined at high level and the thickness increase rate at high temperatures is suppressed.

The exemplary embodiments and examples and may be variously modified. For instance, in the exemplary embodiments and examples, a secondary battery having a winding structure was described. However, the present application may be applied similarly as well to a secondary battery having a structure where a cathode and an anode are folded or piled up. In addition, the present application may be applied as well to a coin, button or rectangular secondary battery.

Furthermore, the secondary battery where a non-aqueous electrolytic solution or gel-like electrolyte is used as an electrolyte was described in the exemplary embodiments. However, the present application may be applied similarly as well to a secondary battery that uses a solid electrolyte. As the solid electrolyte, as long as it is a material having ionic conductivity, any one of inorganic solid electrolyte and high molecule solid electrolyte may be used. Examples of inorganic solid electrolyte that makes use of an ion conducting inorganic material include lithium nitride, lithium iodide, ion conducting ceramic, ion conducting crystal or ion conducting glass. A high molecule solid electrolyte that makes use of an ion conducting high molecule is made of an electrolyte salt and a high molecule compound dissolving the electrolyte salt. Examples of the high molecule compound include ether-based high molecules such as poly(ethylene oxide) or crosslinked body thereof, poly(methacrylate) ester-base high molecule and acrylate-based high molecule. Specific examples thereof include polyether, polyester, polyphosphazene or polysiloxane and these may be used singularly or copolymerized in a molecule or mixed.

Still furthermore, in above-described exemplary embodiments and examples, a so-called lithium ion secondary battery where the anode capacity is expressed by a capacity component caused by absorption and release of lithium was described. However, the present application is applied as well to a so-called lithium metal secondary battery where the anode is configured of lithium metal, the anode capacity is expressed by a capacity component caused by precipitation and dissolution of lithium, and a secondary battery where a charging capacity of an anode material capable of absorbing and releasing lithium is made smaller than the charging capacity of the cathode and thereby the anode capacity is made so as to be including a capacity component caused by absorption and release of lithium and a capacity component caused by precipitation and dissolution of lithium, and expressed by the sum of these capacity component.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material for non-aqueous electrolyte secondary battery, comprising:

a particle containing a cathode material capable of absorbing and releasing lithium; and a film that is disposed at least partially to the particle and contains a metal salt represented by a formula (2):

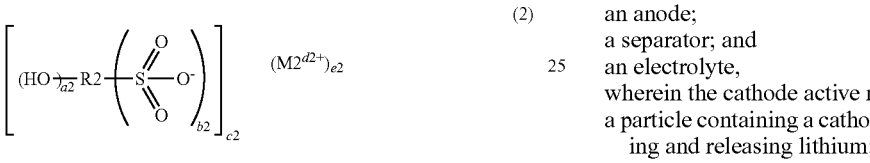

(2)

where R2 represents a chain saturated hydrocarbon group, a chain unsaturated hydrocarbon group or a ring saturated hydrocarbon group, where M2 represents lithium, and where a2, b2, c2, d2 and e2 each represent an integer of 1 or more.

2. The cathode active material for non-aqueous electrolyte secondary battery according to claim 1, wherein the metal salt represented by the formula (2) is at least one kind selected from the group consisting of lithium 2-hydroxypropane sulfonate and lithium 2-hydroxypropene sulfonate.

3. The cathode active material for non-aqueous electrolyte secondary battery according to claim 1, wherein the film contains an alkali metal salt or an alkaline earth metal salt different from the metal salt represented by the formula (2).

4. The cathode active material for non-aqueous electrolyte secondary battery according to claim 1, wherein the particle at least contains lithium and at least one transition metal.

5. The cathode active material for non-aqueous electrolyte secondary battery according to claim 4, wherein the particle contains cobalt Co and has a layered structure.

6. The cathode active material for non-aqueous electrolyte secondary battery according to claim 4, wherein the particle contains a main transition metal element that is largest in a ratio among transition metals constituting the particle, and wherein at least one element different from the main transition metal element is present at least partially on a surface of the particle.

7. The cathode active material for non-aqueous electrolyte secondary battery according to claim 6, wherein the particle contains at least one of nickel Ni, manganese Mn and phosphorus P as an element different from the main transition metal element.

8. A cathode for non-aqueous electrolyte secondary battery, comprising:

a conductive base material; and a cathode active material layer that is disposed on the conductive base material and at least contains a cathode active material, wherein the cathode active material includes:

a particle containing a cathode material capable of absorbing and releasing lithium; and a film that is disposed at least partially on the particle and contains a metal salt represented by a formula (2):

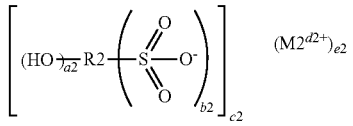

(2)

where R2 represents a chain saturated hydrocarbon group, a chain unsaturated hydrocarbon group or a ring saturated hydrocarbon group, where M2 represents lithium, and where a2, b2, c2, d2 and e2 each represent an integer of 1 or more.

9. A non-aqueous electrolyte secondary battery comprising:

a cathode having a cathode active material;

an anode;

a separator; and an electrolyte, wherein the cathode active material includes:

a particle containing a cathode material capable of absorbing and releasing lithium; and a film that is disposed at least partially on the particle and contains a metal salt represented by a formula (2):

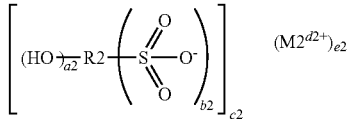

(2)

where R2 represents a chain saturated hydrocarbon group, a chain unsaturated hydrocarbon group or a ring saturated hydrocarbon group, where M2 represents lithium, and where a2, b2, c2, d2 and e2 each represent an integer of 1 or more.

10. The non-aqueous electrolyte secondary battery according to claim 9, wherein the upper limit charge voltage is 4.25 V or more and 4.80 V or less and the lower limit charge voltage is 2.80 V or more and 3.00 V or less.

*11. The cathode active material for non-aqueous electrolyte secondary battery according to claim 4, wherein the particle has a coating on a surface thereof.*

*12. The cathode active material for non-aqueous electrolyte secondary battery according to claim 11, wherein the particle is a lithium-containing composite oxide, and wherein the coating includes a compound containing an element different from a main transition metal of the lithium-containing composite oxide.*

*13. The cathode active material for non-aqueous electrolyte secondary battery according to claim 4, wherein the film further includes any one of an alkali metal salt and an alkaline earth metal salt different than the metal salt represented by the formula (2).*

*14. The cathode active material for non-aqueous electrolyte secondary battery according to claim 4, wherein any one of the alkali metal salt and the alkaline earth metal salt is selected from the group consisting of lithium carbonate ($Li_2CO_3$), lithium fluoride (LiF), lithium tetraborate*

($Li_2B_4O_7$), lithium metaborate ($LiBO_2$), lithium pyrophosphate ($Li_4P_2O_7$), lithium tripolyphosphate ($Li_5P_3O_{10}$), lithium orthosilicate ($Li_4SiO_4$), lithium metasilicate ($Li_2SiO_3$), dilithium ethanedisulfonate, dilithium propane disulfonate, dilithium sulfoacetate, dilithium sulfopropionate, dilithium sulfobutanate, dilithium sulfobenzoate, dilithium succinate, trilithium sulfosuccinate, dilithium squarate, magnesium ethanedisulfonate, magnesium propanedisulfonate, magnesium sulfoacetate, magnesium sulfopropionate, magnesium sulfobutanate, magnesium sulfobenzoate, magnesium succinate, trimagnesium disulfosuccinate, calcium ethanedisulfonate, calcium propanedisulfonate, calcium sulfoacetate, calcium sulfopropionate, calcium sulfobutanate, calcium sulfobenzoate, calcium succinate, tricalcium disulfosuccinate, and combinations thereof.

15. The non-aqueous electrolyte secondary battery according to claim 9, wherein the cathode is a band cathode, wherein the anode is a band anode, wherein the band cathode and the band anode are wound through the separator and configured to provide a wounded body that is contained in a battery container.

16. The non-aqueous electrolyte secondary battery according to claim 15, wherein a positive temperature coefficient device is positioned inside the battery container.

17. The non-aqueous electrolyte secondary battery according to claim 15, wherein the battery container is a film-type exterior member.

18. The non-aqueous electrolyte secondary battery according to claim 15, wherein a center pin is positioned in a center of the wounded body.

19. The non-aqueous electrolyte secondary battery according to claim 9, wherein the cathode includes a band cathode current collector, wherein a cathode active material layer includes the cathode active material, and wherein the cathode active material layer is disposed on each side of the band cathode current collector.

20. The non-aqueous electrolyte secondary battery according to claim 9, wherein the cathode includes a band cathode current collector, wherein a cathode active material layer includes the cathode active material, and wherein the band cathode current collector has a region where the cathode active material layer is positioned on one side of the band cathode current collector.

21. The non-aqueous electrolyte secondary battery according to claim 9, wherein the anode includes a band anode current collector, wherein an anode active material layer includes an anode active material, and wherein the anode active material layer is disposed on each side of the band anode current collector.

22. The non-aqueous electrolyte secondary battery according to claim 9, wherein the anode includes a band anode current collector, wherein an anode active material layer includes an anode active material, and wherein the band anode current collector has a region where the anode active material layer is positioned on one side of the band anode current collector.

23. The non-aqueous electrolyte secondary battery according to claim 9, wherein the anode includes an anode active material, and wherein the anode active material includes graphite.

24. The non-aqueous electrolyte secondary battery according to claim 9, wherein the anode includes an anode active material, and wherein the anode active material includes at least one of a silicon simple substance, a silicon compound, a silicon alloy, a tin simple substance, a tin compound, and a tin alloy.

25. The non-aqueous electrolyte secondary battery according to claim 9, wherein the anode includes an anode active material having an anode charge capacity that is greater than a cathode charge capacity of the cathode active material.

26. The non-aqueous electrolyte secondary battery according to claim 9, wherein the electrolyte includes an electrolyte solution.

27. The non-aqueous electrolyte secondary battery according to claim 26, wherein the electrolyte solution includes an electrolyte salt dissolved in an electrolyte solvent.

28. The non-aqueous electrolyte secondary battery according to claim 27, wherein the electrolyte solvent includes at least one of a high dielectric constant solvent and a low viscosity solvent.

29. The non-aqueous electrolyte secondary battery according to claim 27, wherein the electrolyte solvent is selected from the group consisting of lithium perchlorate ($LiClO_4$), lithium hexafluoroarsenate ($LiAsF_6$), lithium hexafluorophosphate ($LiPF_6$), lithium tetrafluoroborate ($LiBF_4$), $LiB(C_6H_5)_4$, $CH_3SO_3Li$, $CF_3SO_3Li$, LiCl, LiBr, and combinations thereof.

30. The non-aqueous electrolyte secondary battery according to claim 9, wherein an upper limit charge voltage is 4.25 V or more and 4.8 V or less.

* * * * *